United States Patent
Leise

(10) Patent No.: US 9,904,928 B1
(45) Date of Patent: Feb. 27, 2018

(54) METHOD AND SYSTEM FOR COMPARING AUTOMATICALLY DETERMINED CRASH INFORMATION TO HISTORICAL COLLISION DATA TO DETECT FRAUD

(71) Applicant: STATE FARM MUTUAL AUTOMOBILE INSURANCE COMPANY, Bloomington, IL (US)

(72) Inventor: William J. Leise, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 395 days.

(21) Appl. No.: 14/627,104

(22) Filed: Feb. 20, 2015

Related U.S. Application Data

(60) Provisional application No. 62/023,711, filed on Jul. 11, 2014.

(51) Int. Cl.
*G06Q 40/08* (2012.01)
*G06Q 30/00* (2012.01)

(52) U.S. Cl.
CPC ......... *G06Q 30/0185* (2013.01); *G06Q 40/08* (2013.01)

(58) Field of Classification Search
CPC .................................................. G06Q 40/08
USPC .................................................... 705/4
See application file for complete search history.

(56) References Cited

U.S. PATENT DOCUMENTS

| | | | |
|---|---|---|---|
| 5,038,384 A | 8/1991 | Ohoba | |
| 5,317,503 A | 5/1994 | Inoue | |
| 5,504,674 A | 4/1996 | Chen et al. | |
| 5,943,295 A | 8/1999 | Varga et al. | |
| 5,950,169 A | 9/1999 | Borghesi et al. | |
| 6,185,537 B1 | 2/2001 | Oh et al. | |
| 6,186,537 B1 * | 2/2001 | Breed | B60N 2/002 180/282 |
| 6,225,891 B1 | 5/2001 | Lyons et al. | |
| 6,333,997 B1 | 12/2001 | Hashiya et al. | |
| 6,431,593 B1 | 8/2002 | Cooper et al. | |
| 6,438,475 B1 | 8/2002 | Gioutsos et al. | |
| 6,557,889 B2 | 5/2003 | Breed | |
| 6,644,688 B1 | 11/2003 | Hu et al. | |
| 7,080,080 B1 | 7/2006 | Miller | |
| 7,324,951 B2 | 1/2008 | Renwick et al. | |
| 7,635,676 B2 | 12/2009 | Allison | |
| 8,311,856 B1 | 11/2012 | Hanson et al. | |
| 8,346,578 B1 | 1/2013 | Hopkins, III et al. | |

(Continued)

OTHER PUBLICATIONS

Predictive Modeling—An Overview of Analytics in Claims Management by William Lentz, Gen Re, New York Nov. 2013.*

(Continued)

*Primary Examiner* — Bruce I Ebersman

(74) *Attorney, Agent, or Firm* — Marshall, Gerstein & Borun LLP; Randall G. Rueth

(57) ABSTRACT

To detect a risk of insurance fraud in a vehicle insurance claim for physical injuries, injury data may be retrieved from previous crashes involving similar type vehicles as the damaged vehicle, and having similar crash characteristics. A likelihood that the claimant suffered physical injuries from the crash may be determined based on the percentage of people who suffered similar injuries according to the injury data. If the likelihood is very small, the claim for physical injuries may be flagged as a risk of fraud.

12 Claims, 10 Drawing Sheets

(56) References Cited

U.S. PATENT DOCUMENTS

| | | |
|---|---|---|
| 8,494,790 B2 | 7/2013 | Zhu et al. |
| 8,694,341 B1 | 4/2014 | Hanson et al. |
| 8,731,977 B1* | 5/2014 | Hardin .................. G06Q 40/08 701/482 |
| 8,885,916 B1 | 11/2014 | Maurer et al. |
| 8,972,100 B2 | 3/2015 | Mullen et al. |
| 8,977,033 B1 | 3/2015 | Maurer et al. |
| 8,977,425 B1 | 3/2015 | Mullen et al. |
| 2002/0007225 A1 | 1/2002 | Costello et al. |
| 2002/0007289 A1 | 1/2002 | Malin et al. |
| 2002/0087488 A1 | 7/2002 | Fordahl et al. |
| 2002/0103577 A1 | 8/2002 | Newport |
| 2002/0103622 A1 | 8/2002 | Burge |
| 2002/0185324 A1 | 12/2002 | Campbell et al. |
| 2003/0015898 A1 | 1/2003 | Breed |
| 2003/0046003 A1 | 3/2003 | Smith et al. |
| 2003/0078798 A1 | 4/2003 | Zaks et al. |
| 2004/0036261 A1 | 2/2004 | Breed |
| 2004/0044549 A1 | 3/2004 | Loop |
| 2004/0066188 A1 | 4/2004 | Goldfine et al. |
| 2004/0117081 A1 | 6/2004 | Mori |
| 2004/0153356 A1 | 8/2004 | Lockwood et al. |
| 2004/0233461 A1 | 11/2004 | Armstrong et al. |
| 2005/0025357 A1 | 2/2005 | Landwehr et al. |
| 2005/0049912 A1 | 3/2005 | Troyer et al. |
| 2005/0125127 A1 | 6/2005 | Bomar et al. |
| 2005/0131607 A1 | 6/2005 | Breed |
| 2005/0276401 A1* | 12/2005 | Madill, Jr. ............. G06Q 40/08 379/114.14 |
| 2006/0081071 A1 | 4/2006 | Kessler et al. |
| 2006/0129295 A1 | 6/2006 | Foo et al. |
| 2006/0210192 A1 | 9/2006 | Orhun |
| 2006/0222207 A1 | 10/2006 | Balzer et al. |
| 2006/0232052 A1 | 10/2006 | Breed |
| 2006/0251293 A1 | 11/2006 | Piirainen et al. |
| 2007/0075919 A1 | 4/2007 | Breed |
| 2007/0198155 A1 | 8/2007 | Danisch |
| 2007/0203777 A1 | 8/2007 | Berkey et al. |
| 2007/0229248 A1 | 10/2007 | Mott et al. |
| 2007/0294052 A1 | 12/2007 | Stathis et al. |
| 2008/0082237 A1 | 4/2008 | Breed |
| 2008/0109190 A1 | 5/2008 | Bauer et al. |
| 2008/0243530 A1 | 10/2008 | Stubler |
| 2008/0243556 A1 | 10/2008 | Hogan et al. |
| 2008/0255887 A1 | 10/2008 | Gruter |
| 2008/0306996 A1 | 12/2008 | McClellan et al. |
| 2009/0001976 A1 | 1/2009 | Cech et al. |
| 2009/0062978 A1 | 3/2009 | Picard |
| 2009/0189754 A1 | 7/2009 | Hochrein |
| 2009/0319212 A1 | 12/2009 | Cech et al. |
| 2009/0326989 A1 | 12/2009 | Schmitt et al. |
| 2010/0138242 A1 | 6/2010 | Ferrick et al. |
| 2010/0207754 A1 | 8/2010 | Shostak et al. |
| 2010/0303336 A1 | 12/2010 | Abraham et al. |
| 2010/0305977 A1 | 12/2010 | Hogan et al. |
| 2011/0087505 A1 | 4/2011 | Terlep |
| 2011/0134238 A1 | 6/2011 | Kotchou et al. |
| 2011/0313936 A1 | 12/2011 | Sieger |
| 2012/0113141 A1 | 5/2012 | Zimmerman et al. |
| 2012/0188105 A1 | 7/2012 | Alkhalaf |
| 2012/0265563 A1 | 10/2012 | Kwasny |
| 2012/0311053 A1 | 12/2012 | Labrie et al. |
| 2013/0093882 A1 | 4/2013 | Kotzur et al. |
| 2013/0218761 A1 | 8/2013 | Kwasny |
| 2014/0012748 A1 | 1/2014 | Knapp et al. |
| 2014/0023280 A1 | 1/2014 | Lin et al. |
| 2014/0079326 A1 | 3/2014 | Ito et al. |
| 2014/0118496 A1 | 5/2014 | Calakli et al. |
| 2014/0161308 A1 | 6/2014 | Krishnamoorthy |
| 2014/0193039 A1 | 7/2014 | Wexler |
| 2014/0244075 A1 | 8/2014 | Litwinowicz et al. |
| 2014/0277916 A1 | 9/2014 | Mullen et al. |
| 2014/0278571 A1 | 9/2014 | Mullen et al. |
| 2014/0278572 A1 | 9/2014 | Mullen et al. |
| 2014/0309805 A1 | 10/2014 | Ricci |
| 2014/0375446 A1 | 12/2014 | Wanami et al. |
| 2015/0025917 A1* | 1/2015 | Stempora ............... G06Q 40/08 705/4 |
| 2015/0039397 A1 | 2/2015 | Fuchs |
| 2015/0039522 A1 | 2/2015 | Dillard et al. |
| 2015/0149218 A1 | 5/2015 | Bayley et al. |

OTHER PUBLICATIONS

U.S. Appl. No. 14/635,043, filed Mar. 2, 2015.
U.S. Appl. No. 14/627,076, filed Feb. 20, 2015.
U.S. Appl. No. 14/627,092, filed Feb. 20, 2015.
U.S. Appl. No. 14/627,139, filed Feb. 20, 2015.
U.S. Appl. No. 14/627,145, filed Feb. 20, 2015.
U.S. Appl. No. 14/627,170, filed Feb. 20, 2015.
U.S. Appl. No. 29/518,133, filed Feb. 20, 2015.
Tu et al., "A novel method of intelligent analysis of weave paten based on image processing technology," 4th International Congress on Image and Signal Processing, Oct. 2011, pp. 38-41.
Notice of Allowance for U.S. Appl. No. 14/498,056, dated Nov. 7, 2014.
U.S. Appl. No. 14/498,046, filed Sep. 26, 2014.
U.S. Appl. No. 14/228,617, filed Mar. 28, 2014.
Office Action for U.S. Appl. No. 14/228,617, dated Jun. 20, 2014.
Office Action issued in U.S. Appl. No. 14/627,092 dated Apr. 29, 2015.
Office Action issued in U.S. Appl. No. 14/627,139 dated Apr. 30, 2015.
Office Action issued in U.S. Appl. No. 14/627,170 dated May 20, 2015.
Office Action issued in U.S. Appl. No. 14/627,076 dated Apr. 24, 2015.
Office Action issued in U.S. Appl. No. 14/627,076 dated Sep. 4, 2015.
Office Action issued in U.S. Appl. No. 14/627,092 dated Aug. 19, 2015.
Office Action issued in U.S. Appl. No. 14/627,145 dated Oct. 21, 2015.
Office Action issued in U.S. Appl. No. 14/627,170 dated Oct. 29, 2015.
Office Action issued in U.S. Appl. No. 14/627,092 dated Nov. 24, 2015.
U.S. Appl. No. 14/946,111, filed Nov. 19, 2015.
Office Action issued in U.S. Appl. No. 14/627,076 dated Mar. 28, 2016.
U.S. Appl. No. 15/138,387, filed Apr. 26, 2016.

* cited by examiner

INJURY DATA FOR FORD F-150s
(HAVING DENTED REAR QUARTER PANELS REQUIRING MODERATE REPAIRS)

470

| | Injured | Not Injured | Percentage(%) |
|---|---|---|---|
| 472 → Total | 25 | 100 | 20 |
| 474 → Neck | 10 | 115 | 08 |
| 476 → Back | 05 | 119 | 04 |
| 478 → Head | 15 | 110 | 12 |

*FIG. 5B*

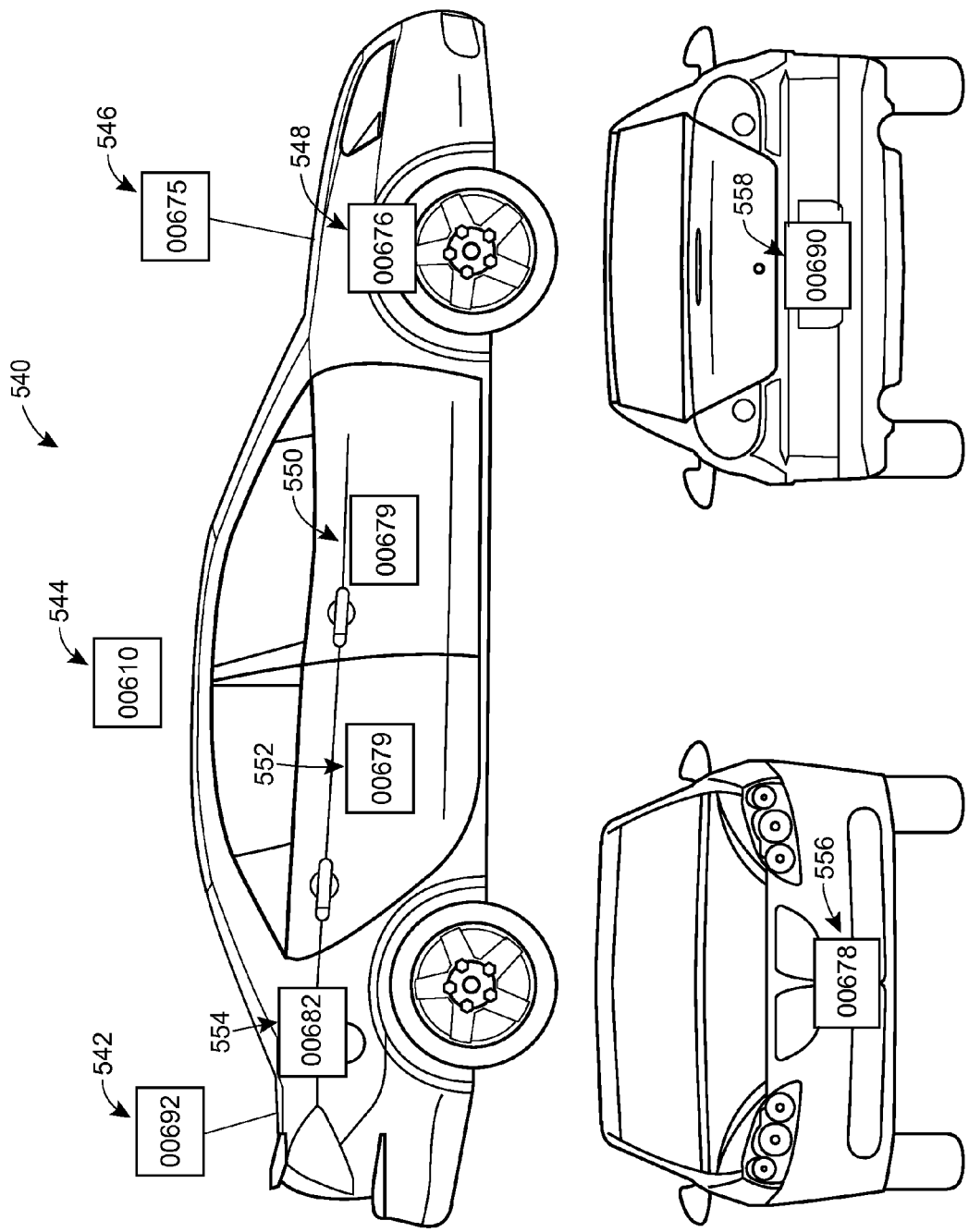

METHOD AND SYSTEM FOR COMPARING AUTOMATICALLY DETERMINED CRASH INFORMATION TO HISTORICAL COLLISION DATA TO DETECT FRAUD

RELATED APPLICATIONS

This application claims priority to and the benefit of the filing date of U.S. Provisional Patent Application No. 62/023,711 entitled "SYSTEM AND METHOD FOR AUTOMATED VEHICLE REPAIR TRIAGE," filed on Jul. 11, 2014, the entire contents of which is hereby expressly incorporated by reference. Additionally, this application is related to the following applications:

Co-pending U.S. patent application Ser. No. 14/627,076, entitled "METHOD AND SYSTEM OF GENERATING AND APPLYING REPAIR CODES TO ESTIMATE COST OF VEHICLE DAMAGE" and filed concurrently herewith;

Co-pending U.S. patent application Ser. No. 14/627,092, entitled "METHOD AND SYSTEM OF USING SPATIAL SENSORS ON VEHICLE FRAME TO DETERMINE CRASH INFORMATION" and filed concurrently herewith;

Co-pending U.S. patent application Ser. No. 14/627,139, entitled "METHOD AND SYSTEM FOR CATEGORIZING VEHICLE TREATMENT FACILITIES INTO TREATMENT COMPLEXITY LEVELS" and filed concurrently herewith;

Co-pending U.S. patent application Ser. No. 14/627,145, entitled "METHOD AND SYSTEM FOR DISPLAYING AN INITIAL LOSS REPORT INCLUDING REPAIR INFORMATION" and filed concurrently herewith; and Co-pending U.S. patent application Ser. No. 14/627,170 entitled "METHOD AND SYSTEM FOR AUTOMATICALLY STREAMLINING THE VEHICLE CLAIMS PROCESS" and filed concurrently herewith, the entire disclosures of each of which are hereby expressly incorporated by reference.

TECHNICAL FIELD

The present disclosure generally relates to a system and a method for treating a vehicle damaged in a crash and, more particularly, to detecting a risk of fraud in vehicle insurance claims based on historical collision data.

BACKGROUND

Every year, vehicles are involved in collisions that result in varying amounts of damage to the vehicle. If the damaged vehicle is insured, an insurance claim is usually filed shortly after the collision. The damaged vehicle is typically brought to a location where an appraisal or assessment of the damage is made. Depending on the extent of the damage and the treatment facility where the damaged vehicle was brought, the damaged vehicle may then need to be further transported to a different treatment facility that is capable of performing the necessary repairs, or in the case where the damage is too costly to repair, to a salvage or a scrap facility. Additional costs are incurred when the damaged vehicle is brought to a first location for the initial appraisal and then to a subsequent location for the repair or salvage. By determining the extent of damage to the vehicle and the corresponding treatment shortly after a collision, the time and costs involved to currently process an insurance claim may be reduced.

SUMMARY

In accordance with a first example aspect of the invention, a method for detecting potential fraud in vehicle insurance claims is provided. The method includes receiving crash information for a damaged vehicle, and receiving an indication of an injury from a person involved in a crash with the damaged vehicle. The method further includes comparing the crash information for the damaged vehicle to historical collision data of a same type of vehicle, determining a set of historical collision data which matches with the damaged vehicle based on the comparison, wherein the historical collision data includes historical injury data. Moreover, the method includes determining a likelihood that the received injury occurred based on the historical injury data corresponding to the set of historical collision data, and when the likelihood is below a predetermined threshold likelihood, generating a suspicious loss indicator for the type of injury.

In accordance with a second example aspect of the invention, a system for detecting potential fraud in vehicle insurance claims is provided. The system includes a communication network, and one or more computing devices communicatively coupled to the communication network, each of the one or more computing devices having a memory and one or more processors. The at least one computing device is configured to receive, via the communication network, crash information for a damaged vehicle, and receive, via the communication network, an indication of an injury from a person involved in a crash with the damaged vehicle. The at least one computing device is further configured to compare the crash information for the damaged vehicle to historical collision data of a same type of vehicle, determine a set of historical collision data which matches with the crash information for the damaged vehicle based on the comparison, wherein the set of historical collision data includes historical injury data, and determine a likelihood that the received injury occurred based on the historical injury data corresponding to the set of historical collision data. When the likelihood is below a predetermined threshold likelihood, the at least one computing device is configured to generate a suspicious loss indicator for the type of injury.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 5B depicts an example injury data table in accordance with the presently described embodiments;

FIG. 6B depicts an example damaged vehicle including repair codes for various vehicle parts in accordance with the presently described embodiments;

DETAILED DESCRIPTION

Figure 1:
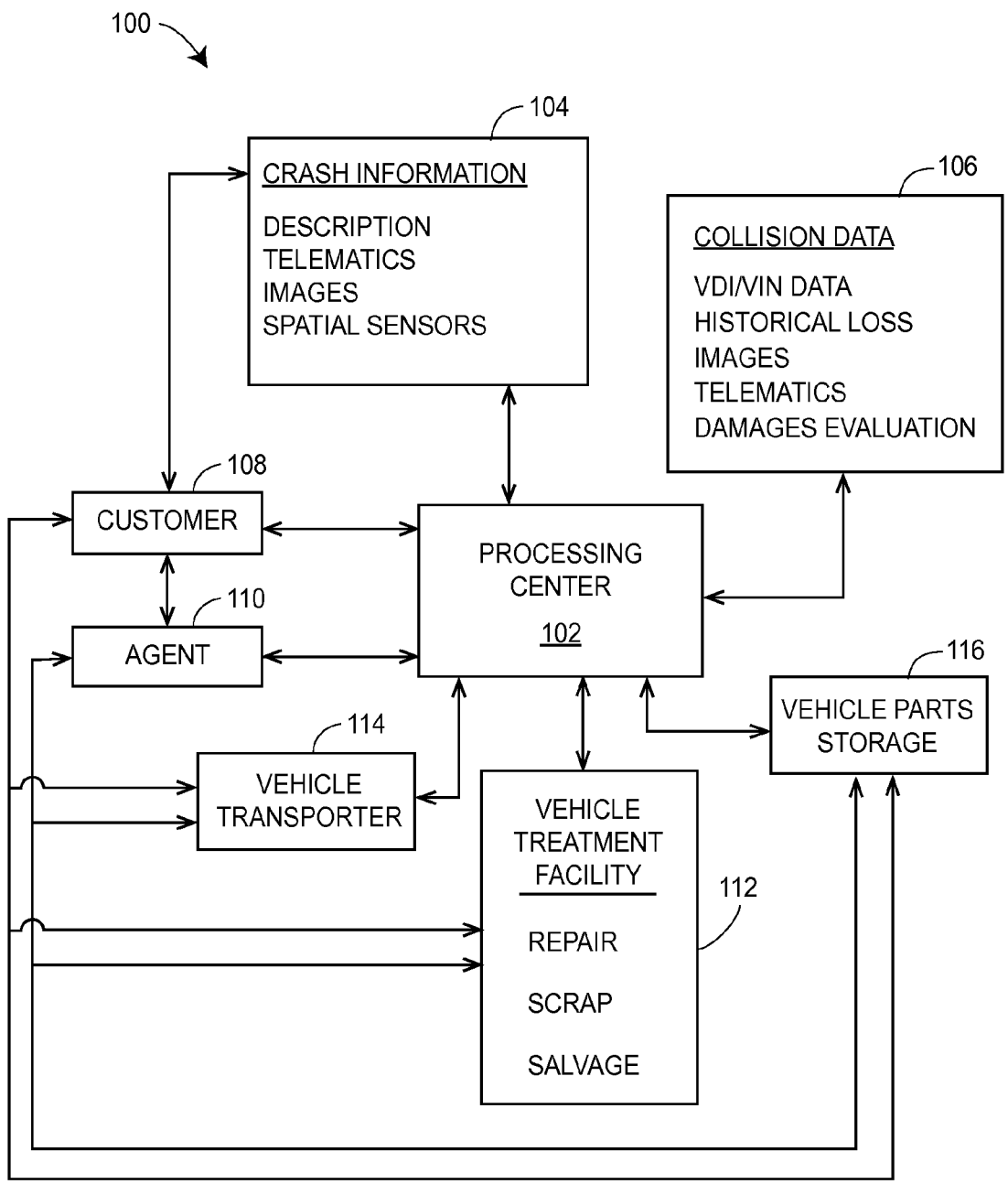
FIG. 1 is a general overview of a vehicle treatment system for treating a vehicle damaged in a crash.

A vehicle treatment system utilizes crash information of a vehicle involved in a crash to approximate the extent of damage to the vehicle and determine a treatment facility for treating the damaged vehicle. The estimated vehicle damage is used to generate repair codes for repairing the vehicle and to estimate the total cost of repair. Moreover, the estimated vehicle damage is also used to detect a risk of insurance fraud by a policy-holder or another person involved in the crash with the vehicle, and also to calculate a treatment complexity level for treating the vehicle. Based on a determined treatment complexity level, the system identifies a treatment facility capable of treating the damaged vehicle and sends information for transporting the damaged vehicle to the treatment facility, thereby removing the need to initially bring the damaged vehicle to an interim location for a damage assessment before transporting the damaged vehicle to a designated treatment facility for treatment.

More specifically, the vehicle treatment system receives crash information in the form of acceleration, velocity, position of vehicle parts relative to the vehicle, and/or impact direction of the vehicle at the time of the crash. To estimate the extent of vehicle damage caused in the crash, the system analyzes one or more aspects of the crash information. In one example embodiment, the system calculates an estimate of the vehicle damage by comparing the crash information to collision data of a vehicle type that includes the damaged vehicle. The collision data may include various levels of vehicle damage associated with specified aspects of collision information. For example, one category of vehicle damage in the collision data may be equated to a particular vehicle acceleration or velocity, or a range of vehicle accelerations or velocities. Other categories of vehicle damage in the collision data may also be equated to a vehicle direction, which indicates where the damaged vehicle was likely impacted. Based on the extent of vehicle damage estimated by the comparison of the crash information to the collision data, the system may detect a risk of fraud by a policy-holder or another person involved in the crash. For example, the system may estimate the likelihood of an injury from the crash based on the comparison of the crash information to the collision data. If an injury is very unlikely and the policy-holder or another person involved in the crash claims physical injuries, the system may flag this as a risk of fraud. Additionally, based on the extent of vehicle damage, the system also determines a treatment complexity level for treating the damaged vehicle.

Thereafter, information related to treating the damaged vehicle is then transmitted by the system. The treatment information may be automatically sent to a treatment facility, a vehicle transporter, a person or entity such as the vehicle owner, or an associated insurance agent, for example. As such, this system allows for vehicles damaged in a collision to be transported directly to a treatment facility capable of performing the desired treatment, e.g., repair, salvage, scrap; soon after the crash, thereby avoiding the time associated with bringing the damaged vehicle to an assessment center or having an adjuster visit the damaged vehicle to assess an insurance claim before the damaged vehicle is brought to a designated treatment facility.

FIG. 1 is a general overview of a system 100 for determining a treatment of a vehicle damaged in a crash. As used herein, the term "vehicle" refers to any type of powered transportation device, which includes, and is not limited to, an automobile, truck, bus, motorcycle, or boat. While the vehicle may normally be controlled by an operator, it is to be understood that the vehicle may be unmanned and remotely or autonomously operated in another fashion, such as using controls other than the steering wheel, gear shift, brake pedal, and accelerator pedal. The system 100 in FIG. 1 includes a processing center 102 capable of facilitating an analysis of the damaged vehicle's crash information 104. The analysis may include a comparison of the damaged vehicle's crash information 104 with collision data 106 to estimate the extent of vehicle damage and determine a treatment for the vehicle. Throughout this description, the term crash is used in reference to the particular incident in which the vehicle was damaged and the term collision is used in reference to one or more incidents in which another vehicle or vehicles were damaged. The analysis of the crash information 104 may be performed by system personnel and/or a computing device at the processing center 102.

The crash information 104 provided to the processing center 102 includes specific information related to the crash that damaged the vehicle and may include information received from the vehicle owner 108, driver, or occupant, an insurance agent 110 and/or entity of the damaged vehicle, an emergency responder, an accident investigator. The crash information 104 may include impact characteristics of the vehicle involved in the crash, which may be provided to system personnel and/or the processing center 102 by an observer of the damaged vehicle. For example, the driver of the damaged vehicle may provide crash information such as the approximate speed of the vehicle at the time of the crash and what area of the vehicle was damaged. Other observed crash information provided to system personnel and/or the processing center 102 may include whether the vehicle's airbags deployed or if the vehicle is drivable. In addition, images of the damaged vehicle may be used for comparison to images of vehicles of the same or similar type with known damage from other collisions. Some impact characteristics of the crash may be automatically relayed to system personnel and/or the processing center 102 by telematics devices, e.g., sensors, operatively coupled to the vehicle. The sensors enable a computing device to automatically attain impact characteristics such as vehicle acceleration, velocity, position of vehicle parts relative to the vehicle and/or direction at the time of the crash. For example, spatial sensors may be placed at different locations throughout the vehicle. Each spatial sensor may correspond to a vehicle part such as, for example, a front pillar or a portion thereof. A telematics device may communicate with the spatial sensor and determine the position of the sensor relative to the telematics device. In this manner, the telematics device can determine when the spatial sensor moves relative to the telematics device, and can infer that the front pillar has moved from its original position and is therefore damaged by the crash. Moreover, system personnel and/or the processing center 102 may be able to estimate the cost to repair or replace the vehicle part and the extent of the damage to the vehicle part based on the distance in which the spatial sensor moved. Additional crash information may include the damaged vehicle's identification number (VIN) and related data, which may have been made available to system personnel and/or the processing center 102 prior to the crash. The VIN data may include the make, model, year, and type of vehicle as well as previous damage/repair information and insurance claim information associated with the damaged vehicle. Additionally, or alternatively, the crash information may include a vehicle data identifier (VDI) for the damaged vehicle. A VDI may include a plurality of segments corresponding to vehicle attributes associated with an individual vehicle and/or a type, group, or classification of the vehicle. In some embodiments, a VIN may be one example of a VDI.

Collision data 106 generally includes records or compilations of information involving other vehicles damaged in other collisions, such as VIN data, historical loss information including historical injury data associated with the loss, images, telematics information, and vehicle damage evaluation. The collision data 106 may be periodically updated and any of the collision data utilized by system personnel and/or the processing center 102 may be stored in the system 100 and/or operatively coupled to the processing center.

The VIN data may include vehicle manufacturer information such as recommended repair procedures and costs, vehicle part warranties, costs and market value estimations of various vehicles and vehicle parts, etc. The VIN database may also include vehicle safety information including, and not limited to, vehicle part recall information, safety notices, repair notices, etc. Historical loss information may include observed or measured amounts of vehicle damage and the corresponding cost of repair associated with or resulting from known, observed, or measured aspects relating to a collision or impact of another vehicle, such as vehicle acceleration, velocity, position of vehicle parts relative to the vehicle, and/or direction. Some examples of historical loss data include vehicle crash test results, bumper test results, traffic accident investigations, and the like. Various impact characteristics such as vehicle acceleration, velocity, position of vehicle parts relative to the vehicle, direction, and/or image can be compiled into a chart or table and associated with known vehicle damage. A damage evaluation tool may include a guide or template to be used in estimating the extent of vehicle damage. For example, stored images and operating characteristics of vehicles damaged in other collisions may be used to compare with like images and operating characteristics of the vehicle damaged in the crash. In another example, stored collision data related to the movement of vehicle parts in other collisions may be used to compare with like movement for like vehicle parts damaged in the crash.

A risk of insurance fraud by the policy-holder or another person involved in the crash with the damaged vehicle can be flagged by comparing the crash information with the collision data. That is, the extent of vehicle damage resulting from the crash can be estimated by comparing impact aspects of the crash with similar impact aspects of similar vehicles involved in past collisions. The collision data 106 for the similar vehicles involved in past collisions may also include injury data for the vehicle drivers and passengers in the vehicles at the time of the past collisions. Therefore, injury data may be identified for vehicle drivers and passengers involved in past collisions having similar impact aspects of similar vehicles as the damaged vehicle.

If the policy-holder for the damaged vehicle or another person involved in the crash claims certain injuries, the injuries may be compared to injury data from the similar past collisions. If the claimed injuries do not match with the injury data from the similar past collisions (e.g., the number of people claiming the same or similar injuries from similar past collision is less than a predetermined threshold percentage and/or number of people), the injury claim may be flagged as a risk of fraud by generating a suspicious loss indicator. The suspicious loss indicator may be a numerical indicator or score. For example, the suspicious loss indicator may be represented by the percentage or number of people claiming the same or similar injuries from similar past collisions. The suspicious loss indicator may also be a term such as, "high risk," "medium risk," "low risk," etc., a symbol, a color, or any other suitable indicator. When a risk of insurance fraud is detected, the suspicious loss indicator may be transmitted to an insurance agent to investigate the fraud risk or may be provided to a claims center.

Additionally, treatment for the damaged vehicle can also be facilitated by comparing the crash information with the collision data. That is, the extent of vehicle damage resulting from the crash can be estimated by comparing impact aspects of the crash with similar impact aspects of similar vehicles involved in past collisions. The compilation of impact characteristics associated with known vehicle damage from similar vehicles involved in previous collisions can be used as a guide or template to estimate the amount of damage that occurred to the vehicle involved in the crash.

Once the extent of vehicle damage has been estimated, an estimate for treating the vehicle can be determined. In short, various levels of vehicle damage may be equated with various levels of vehicle treatment. That is, the estimated extent of vehicle damage can be equated to a treatment complexity level. For example, minor, medium, and major vehicle damage can be equated to minor, medium and major vehicle repair. Irreparable vehicle damage may be equated to a scrapping or salvaging treatment. More specifically, each damaged vehicle part may be assigned a repair code from a set of repair codes based on the extent of the damage to the vehicle part. The set of repair codes may include a separate repair code for each combination of vehicle characteristics such as make and model of the vehicle being repaired, the vehicle part being repaired, the type of repair for the vehicle part including whether the vehicle part needs to be repaired or replaced, the extent of the damage to the vehicle part, etc. Each repair code may correspond to a cost estimate. In this manner, the repair codes make up a standardized system for automatically determining the cost of vehicle treatment for any type of damage to any type of vehicle based on vehicle characteristics. For example, repair code 00123 may be for repairing the hood of a Honda Accord with slight damage. On the other hand repair code 00426 may be for replacing the bumper of a Nissan Altima with heavy damage. The associated cost estimate for repair code 00123 may be $100 whereas the associated cost estimate for repair code 00426 may be $500. Each assigned repair code may be aggregated and/or combined to determine a total cost estimate for the damaged vehicle. The repair codes are described in more detail below with reference to FIGS. 6A-6C.

Once the vehicle treatment complexity has been estimated, system personnel and/or the processing center 102 may identify a vehicle treatment facility 112 capable of performing the requisite treatment. A vehicle transporter 114 may be contacted by system personnel and/or the processing center 102 to transport the damaged vehicle from the crash site to the identified treatment facility 112, e.g., a service repair center, a scrapping or salvaging facility. For irreparable vehicles, the damaged vehicle may be dismantled before scrapping and undamaged vehicle parts may be salvaged and stored at a warehouse 116 for reuse and resale.

Figure 2:
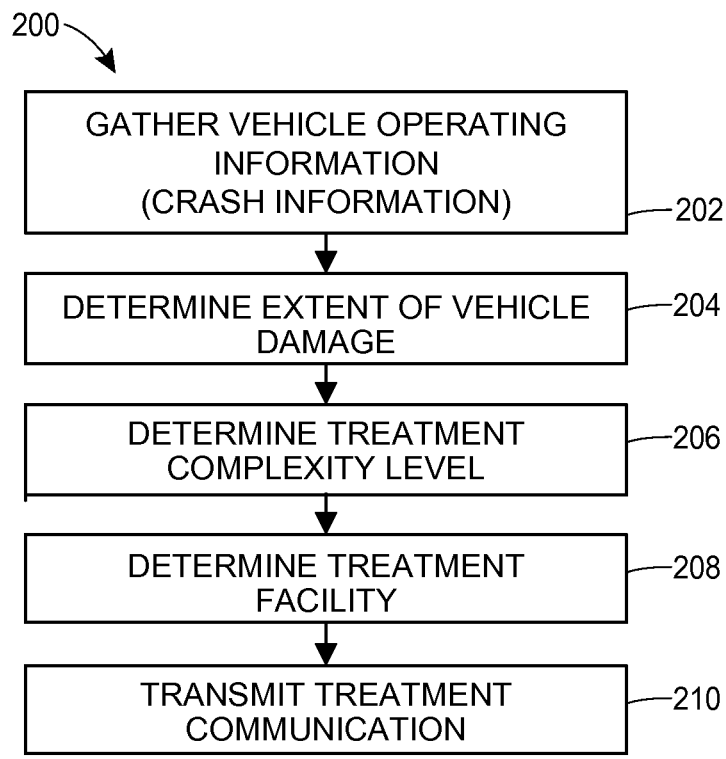
FIG. 2 depicts an example vehicle treatment process capable of being implemented in the vehicle treatment system illustrated in FIG. 1 in accordance with the presently described embodiments.

FIG. 2 is a flow diagram 200 depicting an example embodiment of a vehicle treatment process that may be implemented by the treatment system 100 shown in FIG. 1. More particularly, the method 200 may be executed separately or cooperatively by system personnel and the processing center 102. Vehicle crash information is gathered for analysis (block 202). The vehicle crash information may be provided to system personnel and/or the processing center 102 by a vehicle occupant or emergency responder communicating characteristics of the crash. The crash characteristics may include descriptions of the approximate speed the vehicle was moving at the time of the crash, where the vehicle was damaged, the type of damage to the vehicle, whether the vehicle can be operated and/or moved, if the vehicle's airbags or other safety systems were deployed as a result of the crash, etc.

Crash characteristics may also be provided to system personnel and/or the processing center 102 by the vehicle's engine control unit (ECU) and/or one or more telematics devices that are capable of monitoring and/or noting various vehicle functions, e.g., acceleration, velocity, position of vehicle parts relative to the vehicle, and/or direction of the vehicle at the time of the crash, sometimes referred to as event data recording (EDR). The telematics devices are operatively coupled to the vehicle and may be configured to automatically function when the vehicle is in operation. For example, the vehicle's operating information, e.g., acceleration, velocity, position of vehicle parts, and/or direction of the vehicle, may be periodically monitored when the vehicle is moving. When a crash occurs, the monitored speed, direction of the vehicle, and positions of various vehicle parts may be automatically attained and transmitted to system personnel and/or the processing center 102 as crash characteristics.

When the crash information is received by system personnel and/or the processing center 102, the crash information is analyzed to determine an estimate of the extent of damage caused to the vehicle during the crash (block 204). The analysis may include calculating the extent of damage by comparing the crash information 104 to collision data 106. Based on the estimated vehicle damage, a treatment complexity level is determined (block 206). The treatment complexity level is an estimate indicating the level of difficulty involved with treating the damaged vehicle. The treatment of the vehicle may include repairing or replacing damaged vehicle parts, and in some instances where repairing the vehicle is too costly, scrapping the vehicle. In some embodiments, the treatment complexity level may be determined separately for each individual part damaged in the crash. For example, the hood may require minor repairs whereas the fender may be damaged significantly and require heavy repairs or replacement. The treatment complexity level may also include a price schedule for treating the damaged vehicle, and/or a time duration for completing the treatment of the damaged vehicle. Once the estimated treatment complexity level is determined, one or more treatment facilities capable of performing the requisite treatment may be identified by system personnel and/or the processing center (block 208). System personnel and/or the processing center 102 may then transmit a communication related to the treatment of the damaged vehicle (block 210). For example, system personnel and/or the processing center 102 may contact one or more identified treatment facilities to initiate or inquire further in regard to the continued treatment of the damaged vehicle (block 210).

Figure 3:
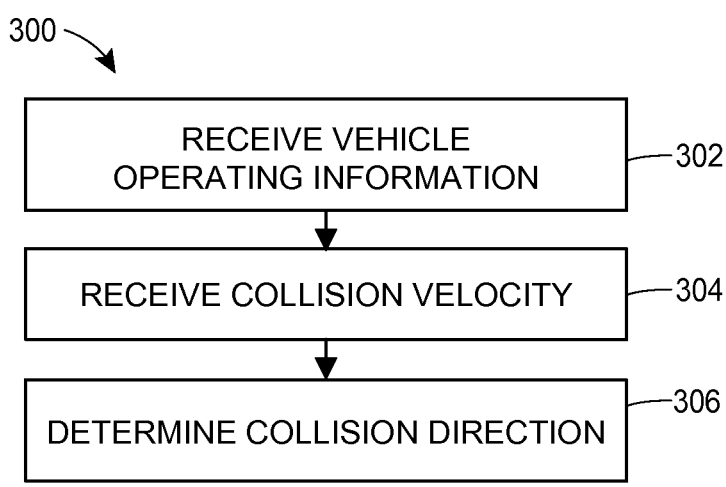
FIG. 3 depicts an example method for gathering or receiving crash information in accordance with the presently described embodiments.

A flow diagram 300 of an example embodiment for gathering vehicle crash information is depicted in FIG. 3. Crash information may be received by system personnel and/or the processing center 102 from an individual(s) present at the crash site, such as a vehicle occupant or an emergency responder (block 302). For example, the driver of the vehicle may contact system personnel and/or the processing center 102 and provide the approximate speed the vehicle was moving at the time of the crash (block 304), where the vehicle was damaged (block 306), descriptions and/or images of the damaged vehicle, whether the vehicle can be started and/or driven, if the vehicle's airbags or other safety systems were deployed as a result of the crash, the position of various vehicle parts in relation to the vehicle, etc. In addition, similar and/or additional crash information may be provided by the vehicle's EDR as well.

In treatment systems 100 where telematics devices are utilized, similar crash information may be automatically provided to system personnel and/or the processing center 102 by a computing device and/or telematics devices operatively coupled to the vehicle. In particular, while the vehicle is being operated, the vehicle's operating information may be monitored by a series of measurements of operating conditions or characteristics pertaining to the operation of the vehicle. For example, one or more computing devices such as a mobile computing device, an on-board computing device, and/or a server device may be communicatively coupled to sensors such as an accelerometer array operatively coupled to the vehicle. The accelerometer array may monitor and/or measure the acceleration of the vehicle along several axes and/or travelling directions. Measured operating information such as vehicle acceleration, velocity, and direction may be logged periodically (e.g., every millisecond, every second, etc.) or conditionally on the occurrence or detection of an event (e.g., a crash) and stored in the system 100, for example, as an event log (e.g., crash log) in a data storage unit of the system or a remote storage unit communicatively coupled to the system. The crash log may include a timestamp to note the time of the measurement. In one example configuration, system personnel and/or the processing center 102 may determine, derive, or deduce additional crash information. In particular, the vehicle acceleration at the time of the crash may be considered primary crash information, wherein additional, or secondary, crash information may include a crash velocity and/or a crash direction, which may be mathematically derived by system personnel and/or the processing center 102 from the acceleration monitored and/or measured via the accelerometer and computing device. More particularly, the system's 100 computing device(s) may monitor, via the accelerometer array, acceleration associated with the vehicle in the X, Y, and/or Z axes and create accelerometer logs. In some embodiments, the X-axis may be oriented along a front-back axis aligned with the vehicle and/or mobile and/or on-board computing device, the Y-axis may be oriented along a side-side axis aligned with the vehicle and/or mobile or on-board computing device, and the Z-axis may be oriented along a top-bottom axis aligned with the vehicle and/or mobile and/or on-board computing device. However, these axes may be positioned in other ways.

Detection of a vehicle crash may be facilitated by the use of the accelerometer. For example, a crash may be detected when a computing device operatively coupled to the accelerometer notes a significant, near immediate increase or decrease in the monitored acceleration in the fore-aft, lateral, and/or vertical direction of the vehicle, e.g., X, Y, and Z axes. Alternatively, a crash may be detected by a GPS unit via detection of a significant increase or decrease in vehicle velocity, or through near-simultaneous activation of an emergency response such as the deployment of an air-bag or an alert, e.g., automatic collision notification (ACN), etc.

In another example, one or more computing devices such as a mobile computing device, an on-board computing device, and/or a server device may be communicatively coupled to spatial sensors such as radio frequency identification (RFID) sensors, positioning beacons, etc., placed on several vehicle parts throughout the vehicle. The on-board computing device and/or mobile computing device may receive identification information from the spatial sensors and determine corresponding vehicle parts attached to the spatial sensors based on the identification. For example, the on-board computing device and/or mobile computing device may store a known original location or reference point and a corresponding vehicle part for each spatial sensor, which may be retrieved upon receiving identification information for the spatial sensor. Moreover, the on-board computing device and/or mobile computing device may use triangulation and/or trilateration to determine the location of the spatial sensors by measuring angles and/or distances from the spatial sensors to the known positions of RFID readers, wireless radios, etc., disposed within the on-board computing device and/or mobile computing device. The determined location for a spatial sensor may be compared to the known original location or reference point for the spatial sensor to determine whether the spatial sensor has moved as a result of the crash. Moreover, in some embodiments, the on-board computing device and/or mobile computing device may compare the measured distances to known original distances between the spatial sensors and the on-board computing device and/or mobile device to determine whether the spatial sensors have moved as a result of the crash.

In trilateration, the distances may be measured or approximated based on a received signal strength (RSS) of the RFID signal or positioning signal from one of the spatial sensors. The stronger the received signal, the closer the spatial sensor is to the on-board computing device and/or the mobile computing device. For example, based on the RSS, the on-board computing device may determine the spatial sensor is 3 meters from a first wireless radio disposed within the on-board computing device, 3.2 meters from a second wireless radio, and 3.4 meters from a third wireless radio. Then, for example, the on-board computing device may calculate the exact location of the spatial sensor based on the spatial sensor's relative distance to the first, second, and third wireless radios.

Measured position information of the spatial sensors may be logged periodically (e.g., every millisecond, every second, etc.) or conditionally on the occurrence or detection of an event (e.g., a crash) and stored in the system 100, for example, as an event log (e.g., crash log) in a data storage unit of the system or a remote storage unit communicatively coupled to the system. The crash log may include a timestamp to note the time of the measurement. Furthermore, detection of a vehicle crash may be facilitated by the use of the spatial sensors. For example, a crash may be detected when the on-board computing device and/or the mobile device operatively coupled to the spatial sensors notes a significant change in the position of one of the spatial sensors indicating that a vehicle part has moved more than a predetermined threshold distance from its original position relative to the vehicle. In some embodiments, when such significant change occurs, the measured position information may be provided to the processing center 102. Moreover, the distance a vehicle part moves may be used to determine the extent of the damage to the vehicle part. For example, spatial sensors disposed throughout the vehicle frame body may be used to detect a particular portion of the frame body has moved from its original alignment. If the particular portion of the frame body moves a few centimeters, realignment may be a faster and less expensive process than if the portion of the frame body moves a meter.

Figure 4:
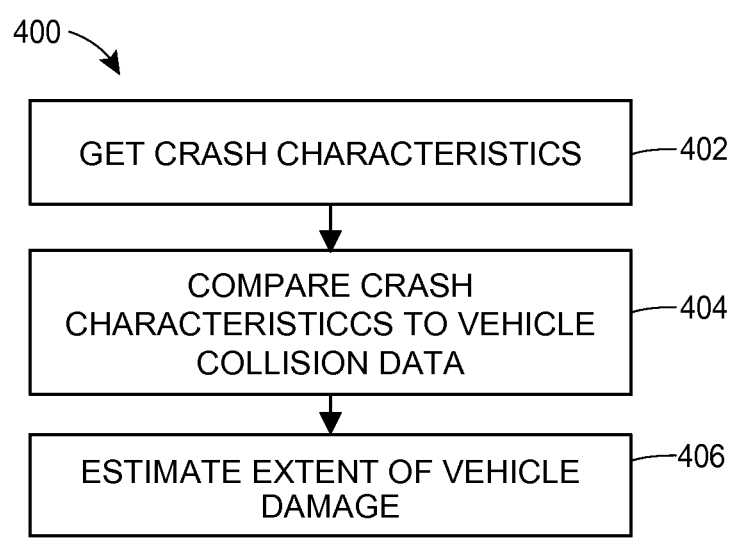
FIG. 4 depicts an example method for estimating the extent of vehicle damage in accordance with the presently described embodiments.

A flow diagram 400 of an example embodiment for estimating the extent of vehicle damage is depicted in FIG. 4. Some or all of the method for estimating the extent of vehicle damage may be implemented by system personnel and/or the processing center 102. In particular, system personnel may utilize crash characteristics provided by an individual present at the crash site, such as the driver and/or occupant of the damaged vehicle or an emergency responder (block 402). For example, descriptions and images of the damaged vehicle and an approximate speed of the vehicle at the time of the crash and the direction of where the vehicle was damaged may be provided to system personnel by the driver of the vehicle. Alternatively, system personnel and/or the processing center 102 may utilize crash characteristics automatically attained by telematics devices operatively coupled to the vehicle. Some examples of crash characteristics include, and are not limited to, vehicle acceleration, velocity, position of vehicle parts within the vehicle, and/or direction. Some crash information may be attained by an accelerometer and an array of sensors including spatial sensors at the time of the crash and the transmitted via a wireless communication module to system personnel and/or the processing center 102. System personnel and/or the processing center 102 may then analyze the crash information. In one example embodiment, system personnel and/or the processing center 102 may compare various combinations crash characteristics to collision data (block 404). The collision data may include historical loss information of similar type vehicles damaged in past collisions. The collision data may be compiled from past collisions and/or from laboratory crash test results involving other vehicles of the same or similar type as the damaged vehicle. The collision data may further include one or several combinations of impact or collision characteristics that are equated and/or associated to a known amount of vehicle damage. For example, vehicle damage associated with front-end impacts at various vehicle speeds may be associated with a list of vehicle parts likely to need repair and/or replacement from such impacts. By comparing the crash characteristics of the damaged vehicle to impact and/or collision characteristics of the collision data, an extent of damage to the damaged vehicle may be estimated (block 406). In some embodiments, an extent of damage to individual vehicle parts of the damaged vehicle may be estimated by comparing the crash characteristics associated with individual vehicle parts to impact and/or collision characteristics of the collision data.

In some embodiments, a repair code may be generated based on the estimated extent of the damage to the vehicle part. The repair code may be associated with a cost estimate for repairing or replacing the vehicle part, and one or more repair codes generated for the damaged vehicle may be aggregated to determine a total cost estimate for repairing the damaged vehicle.

Figure 5A:
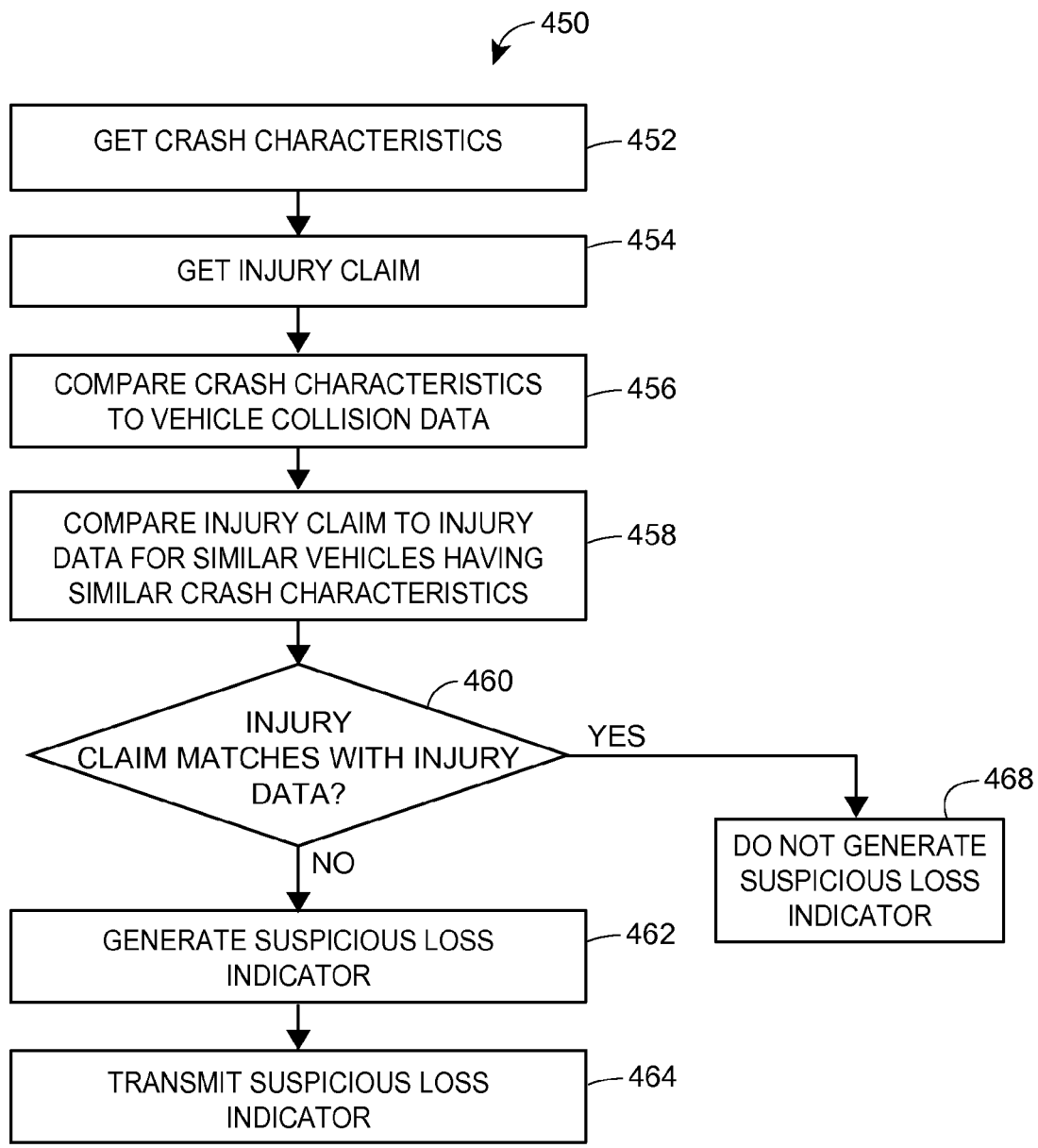
FIG. 5A depicts an example method for detecting a risk of insurance fraud based on collision data in accordance with the presently described embodiments.

In addition to estimating the extent of vehicle damage, collision data may be used to detect risks of insurance fraud. FIG. 5A depicts a flow diagram 450 of an example embodiment for detecting risks of insurance fraud based on collision data, which may be accomplished by system personnel and/or the processing center 102. The collision data may include injury data for injured drivers and/or passengers in past collisions. For example, the collision data may include information on the percentage of drivers and/or passengers who were injured driving Toyota Priuses which experienced heavy damage to the hood and front frame rails during past collisions. More specifically, the collision data may include information on the type of injuries suffered by those drivers and/or passengers (e.g., neck injuries, severe head trauma, etc.), as well as the percentage of drivers and/or passengers who suffered each type of injury.

In particular, system personnel and/or the processing center 102 may utilize crash characteristics provided by an individual present at the crash site, such as the driver and/or occupant of the damaged vehicle or an emergency responder or crash characteristics automatically attained by telematics devices operatively coupled to the vehicle (block 452). For example, descriptions and images of the damaged vehicle, vehicle acceleration, velocity, position of vehicle parts within the vehicle, and/or direction of the vehicle may be provided. Some crash information may be attained by an accelerometer and an array of sensors including spatial sensors at the time of the crash and then transmitted via a wireless communication module to system personnel and/or the processing center 102.

System personnel and/or the processing center 102 may also receive an injury claim from the policy-holder for the vehicle, or another person injured in the crash (block 454). For example, the injury claim may be for a driver and/or passenger in the damaged vehicle at the time of the crash or a driver and/or passenger in another vehicle that is also damaged as a result of the crash. The injury claim may include the type of injury, the severity of the injury, medical expenses, other complications as a result of the injury, the location of the person when the injury occurred, etc.

System personnel and/or the processing center 102 may then analyze the crash information. In one example embodiment, system personnel and/or the processing center 102 may compare various combinations of crash characteristics to collision data (block 456). The collision data may include historical loss information of similar type vehicles damaged in past collisions. The collision data may also include injury data for injured drivers and/or passengers in past collisions. The injury data may be for drivers and/or passengers of the damaged vehicle as well as for drivers and/or passengers of other vehicles involved in the crash. In this manner, the system personnel and/or the processing center 102 may determine injury data for a subset of the collision data for similar type vehicles and having similar crash characteristics and/or a similar extent of damage. For example, if the damaged vehicle is a Ford F-150 with a dented rear bed panel requiring moderate repairs, injury data may be generated for all Ford F-150s with dented rear bed panels requiring moderate repair from past collisions. In some embodiments, injury data may be generated for all Ford F-150s with dented rear bed panels requiring moderate repair and having any other type(s) of damage as well. However, in other embodiments, injury data may be generated specifically for Ford F-150s having only dented rear bed panels requiring moderate repair from past collisions. In yet other embodiments, injury data may be generated for Ford F-150s having a combination of crash characteristics. For example, injury data may be generated for Ford F-150s which crashed at speeds of between 10 and 20 miles per hour, which rear-ended other vehicles, and/or which have front frame rails that moved at least 1 meter as a result of the crash.

An example injury data table 470 for F-150s having the above described damage is illustrated in FIG. 5B. As mentioned above, the injury data may be stored with the collision data 106 which may be stored in the system 100 and/or operatively coupled to the processing center 102. The example injury data table 470 includes an entry for the total number of people injured, 25 (reference 472), in crashes involving a Ford F-150 where the damaged vehicle has a dented rear bed panel requiring moderate repair. The data table 470 also includes entries for the total number of people who were not injured, 100, and the percentage of people who were injured, 20 percent. Moreover, the data table 470 also includes entries for the number of people as well as the percentage of people with neck injuries 474, back injuries 476, and head injuries 478 as a result of the crashes. Some people injured in the crashes may have suffered multiple injuries (e.g., back and head, head and neck, etc.).

In some embodiments, the injury data table 470 may also include the number of people who suffered injuries of varying severity. For example, out of the 25 people injured in the data table 470, ten people may have suffered severe injuries, ten people may have suffered moderate injuries, two people may have suffered minor injuries, etc. Moreover, the data table 470 may also include the locations of the people who suffered injuries in the vehicle (e.g., the driver's seat, the front passenger seat, the back left seat, etc.), as well as the number of people who suffered injuries in other vehicles (e.g., 15 percent of the people were injured in Ford F-150s, while 85 percent were injured in other vehicles as a result of colliding with Ford F-150s). Additionally, the injury data table 470 may include any other suitable injury data for past collisions involving Ford F-150s having dented rear bed panels requiring moderate repairs. While the injury data table 470 is specific to injury data for Ford F-150s having dented rear bed panels requiring moderate repairs, there may be several other injury data tables for Ford F-150s having one or more other damaged vehicle parts with varying extents of damage. There may also be several other injury data tables for other vehicle makes and/or models. Moreover, the injury data table 470 may be specific to those injured in Ford F-150s, and there may be a separate injury data table and/or injury data for those injured by Ford F-150s. In some embodiments, in addition or as an alternative to including the total number of people who suffered various injuries of varying severity, the injury data table 470 may include a percentage of people who suffered various injuries, a probability that a driver and/or passenger in a particular type of crash will suffer a particular type of injury, or any other suitable likelihood that a person will suffer an injury based on the crash characteristics.

In any event, the example injury data table 470 of FIG. 5B, or any other suitable injury data may be compared with the claimed injury for detecting a risk of fraud. Turning back to FIG. 5A, the injury claim may be compared to injury data for similar type vehicles and having similar crash characteristics and/or similar extent of damage as the damaged vehicle (block 458). For example, if the injury claim is a claim for a severe back injury from the driver of a Ford F-150 that is determined to have a dented rear bed panel requiring moderate repairs, the injury claim may be compared to the injury data table 470 of FIG. 5B to determine whether the injury claim matches with the injury data (block 460).

To determine whether the injury claim matches the injury data, the processing center 102 may compare the percentage of people injured in the injury data to a predetermined threshold likelihood, e.g., 20 percent. The likelihood may be a percentage such as 40 percent, may be a probability such as 0.9, may be a category from a set of categories (e.g., "unlikely," "likely," "very likely," etc.), or may be indicated in any other suitable manner. If the percentage of people injured in the injury data is at or above the predetermined threshold likelihood, a suspicious loss indicator may not be generated (block 468). On the other hand, if the percentage of people injured in the injury data is less than the predetermined threshold likelihood, a suspicious loss indicator may be generated (block 462) and transmitted to an insurance agent, a claims center, etc. (block 464).

In some embodiments, the total percentage of people injured for similar type vehicles and having similar crash characteristics and/or similar extent of damage as the damaged vehicle, may not be the only criteria for determining whether the injury claim matches with the injury data. Other criteria may include the percentage of people having the same type of injury (e.g., back, neck, head, etc.), the same injury severity (e.g., minor injuries, moderate injuries, severe injuries), the same location within the vehicle (e.g., driver's seat, passenger front seat, back right seat, etc.), the same vehicle (e.g., in the Ford F-150 or collided with the Ford F-150), etc. Each of these criteria may be compared to a same and/or different threshold likelihoods to determine whether the injury claim matches the injury data. The injury data may be compared to one or more of the different threshold likelihoods to determine whether the injury claim matches the injury data. For example, the processing center 102 may determine for the injury claim to match the injury data, at least twenty percent of the people must have been injured, at least ten percent must have suffered the same type of injury, at least five percent must have suffered the same or a worse injury severity, etc.

As mentioned above, if the injury claim does not match the injury data, a suspicious loss indicator may be generated. The suspicious loss indicator may be represented by the percentage or number of people claiming the same or similar injuries from similar past collisions. The suspicious loss indicator may also be a phrase such as, "high risk," "medium risk," "low risk," etc., a symbol, a color, or any other suitable indicator.

In some embodiments, a risk of fraud may also be detected by comparing the cost of repair from a treatment facility to a cost estimate for the repair, for example, as determined by the repair codes. If the cost of repair from the treatment facility exceeds the cost estimate by a substantial amount, the cost of repair may be flagged as a risk of fraud and a suspicious loss indicator may be generated and transmitted to a mobile computing device of an insurance agent, a claims center, etc.

Figure 6A:
FIG. 6A depicts an example table of damage repair codes for estimating the cost of repairing vehicle damage in accordance with the presently described embodiments.

FIG. 6A depicts an example table 520 of damage repair codes for estimating the cost of repairing vehicle damage. The example table 520 includes example repair codes which may be a small subset of a larger set of repair codes. As mentioned above, the set of repair codes may include a separate repair code for each combination of vehicle characteristics such as make and model of the vehicle being repaired, the vehicle part being repaired, the type of repair for the vehicle part including whether the vehicle part needs to be repaired and/or replaced, the extent of the damage to the vehicle part, etc. Each repair code may correspond to a cost estimate, where the cost estimate may be determined based on collision data including historical loss information of similar type vehicle having similar type damage. For example, the associated cost estimate for a repair code corresponding to repairing the quarter panel of a Ford Taurus having moderate damage may be determined by analyzing repair costs from historical loss information related to repairing quarter panels of Ford Tauruses having moderate damage from past collisions. In some embodiments, the repair codes may be stored in the system 100 and/or operatively coupled to the processing center 102.

As shown in FIG. 6A, repair code 00675 (reference 522) is associated with an instruction, "Refinish Hood," and a cost estimate, $300. While the instruction for repair code 00675 (reference 522) does not specify the extent of the damage to the hood, or the make and model of the vehicle, repair code 00675 (reference 522) may be used for refinishing hoods of Honda Civics with light damage. In some embodiments, a separate repair code, for example, 10675 may be used for refinishing hoods for vehicles of a different make and/or model with light damage. Moreover, yet another repair code, for example, 02675, may be used for refinishing hoods for Honda Civics with moderate damage. Further, in some embodiments, the set of repair codes may be generated based on additional or alternative vehicle characteristics and in other embodiments some of the above mentioned vehicle characteristics may be omitted when generating the set of repair codes.

In any event, repair code 00610 (reference 521) is associated with the instruction, "Repair Roof," and a cost estimate of $700; repair code 00676 (reference 524) is associated with the instruction, "Refinish Fender," and a cost estimate of $200; repair code 00678 (reference 526) is associated with the instruction, "Replace Grille," and a cost estimate of $250; repair code 00679 (reference 528) is associated with the instruction, "Replace Door," and a cost estimate of $500; repair code 00682 (reference 530) is associated with the instruction, "Replace Quarter Panel," and a cost estimate of $400; repair code 00690 (reference 532) is associated with the instruction, "Repair Bumper," and a cost estimate of $100; and repair code 00692 (reference 534) is associated with the instruction, "Repair Trunk Lid," and a cost estimate of $350. Each of these repair codes may be for the same vehicle make and model, for example, a Honda Civic, and may be aggregated and/or combined to estimate the total cost of repair for a damaged Honda Civic. For example, by comparing crash information for a damaged Honda Civic to collision data, a list of damaged vehicle parts including the extent of the damage to each vehicle part may be generated as described above in FIG. 4. A repair code from the set of repair codes may then be assigned to each damaged vehicle part in the list based on the vehicle characteristics for the damaged vehicle. For example, repair code 00679 (reference 528) may be assigned when a door in the Honda Civic needs to be replaced. In some embodiments, repair code 00679 may be assigned twice when two doors in the Honda Civic need to be replaced.

While the example table 520 depicts eight repair codes, this is merely for ease of illustration only. There may be hundreds or thousands of repair codes each corresponding to a different combination of vehicle characteristics. More specifically, each make and model may correspond to a separate subset of repair codes including each combination of vehicle characteristics. For example, repair codes 00600-00699 may correspond to Honda Civics, while repair codes 00700-00799 may correspond to Honda Accords. The make and model for the vehicle may be determined using the VDI/VIN data for the damaged vehicle as described above with reference to FIG. 1. Moreover, in some embodiments, repair codes may also be used in salvaging and/or scrapping treatments. For example, the repair code 19986 may be used for salvaging hoods of Honda Civics in good condition. The associated cost estimate may be a price estimate of the market value of the vehicle part assuming it is sold to a treatment facility or any other auto body shop. The salvage repair codes may have an inverse relationship with the other repair codes. For example, for the salvage repair codes, vehicle parts in better condition may have higher associated price estimates, whereas for the other repair codes, the cost estimates become higher when there is more work that needs to be done to repair the vehicle part. Further, the price estimate may be based on the scarcity/demand for the vehicle part. For example, vehicle parts from a classic car (e.g., a 1964 Chevrolet Corvette), may be in high demand because the car is no longer manufactured. The price estimates for salvage repair codes may be aggregated to determine the total price that an insurance provider can recover by salvaging vehicle parts.

FIG. 6B depicts an example damaged vehicle 540 including repair codes for various vehicle parts. Continuing the example from FIG. 6A, the damaged vehicle 540 may be a Honda Civic, and as a result, repair codes 00600-00699 may be assigned to estimate the cost of repairing the vehicle. Moreover, in some embodiments, the repair codes may be provided to a treatment facility for treating the damaged vehicle so the treatment facility knows what needs to be done to repair the vehicle without having to perform an inspection. The repair codes also may be provided to ensure the treatment facility does not miss anything during the repair.

In any event, crash information for the damaged vehicle 540 may be compared to collision data including historical loss information of similar type vehicles damaged in past collisions to determine which vehicle parts are damaged, and the extent of the damage to the vehicle parts including the type of repair necessary (e.g., whether the vehicle part needs to be repaired and/or replaced) as described above in FIG. 4. A repair code from the set of repair codes may then be assigned to each damaged vehicle part in the list based on the vehicle characteristics for the damaged vehicle.

In the example damaged vehicle 540, the two doors 550 and 552 are assigned the repair code 00679 "Replace Door" with an associated cost estimate of $500 for each door. The front, right fender 548 is assigned repair code 00676 "Refinish Fender" with an associated cost estimate of $200, the hood 546 is assigned repair code 00675 "Refinish Hood" with an associated cost estimate of $300, and the roof 544 is assigned repair code 00610 "Replace Roof" with an associated cost estimate of $700. Further, the trunk lid 542 is assigned repair code 00692 "Repair Trunk Lid" with an associated cost estimate of $350, and the rear quarter panel 554 is assigned repair code 00682 "Replace Quarter Panel" with an associated cost estimate of $400. Additionally, the grille 556 is assigned repair code 00678 "Replace Grille" with an associated cost estimate of $250, and the bumper 558 is assigned repair code 00690 "Repair Bumper" with an associated cost estimate of $100. Combining the cost estimates for each of the repair codes corresponding to the damaged vehicle parts, the total cost for repairing the vehicle may be estimated as $3300. This estimate may be used to pay the policy-holder on the insurance claim, and/or to provide a treatment facility with an expectation of the cost of repair for the damaged vehicle.

Figure 6C:
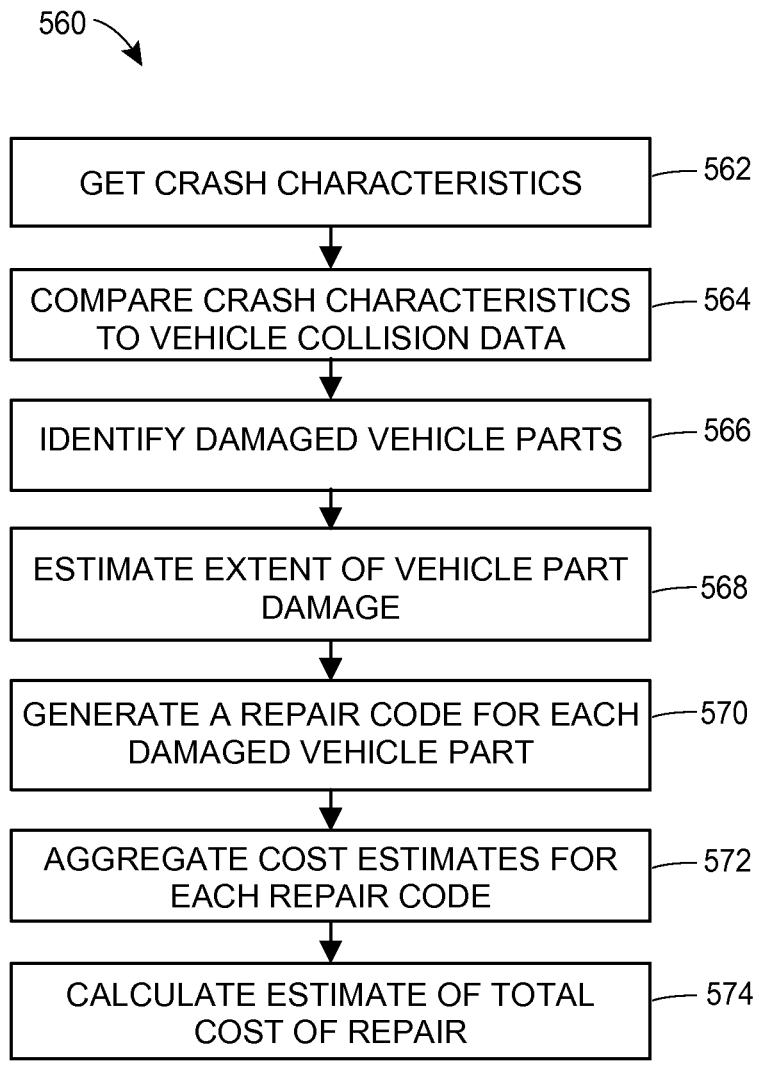
FIG. 6C depicts an example method for estimating the cost of repair for a damaged vehicle in accordance with the presently described embodiments.

FIG. 6C depicts a flow diagram 560 of an example method for estimating the cost of repairing the damaged vehicle. As described above, after a crash, system personnel and/or the processing center 102 may utilize crash characteristics provided by an individual present at the crash site, such as the driver and/or occupant of the damaged vehicle or an emergency responder (block 562). For example, descriptions and images of the damaged vehicle and an approximate speed of the vehicle at the time of the crash and the direction of where the vehicle was damaged may be provided to system personnel by the driver of the vehicle. Alternatively, system personnel and/or the processing center 102 may utilize crash characteristics automatically attained by telematics devices operatively coupled to the vehicle. Some examples of crash characteristics include, and are not limited to, VDI/VIN data, vehicle acceleration, velocity, position of vehicle parts within the vehicle, and/or direction. Some crash information may be attained by an accelerometer and an array of sensors including spatial sensors at the time of the crash and then transmitted via a wireless communication module to system personnel and/or the processing center 102.

System personnel and/or the processing center 102 may then analyze the crash information. In one example embodiment, system personnel and/or the processing center 102 may compare various combinations of crash characteristics to collision data (block 564). The collision data may include historical loss information of similar type vehicles damaged in past collisions. The collision data may be compiled from past collisions and/or from laboratory crash test results involving other vehicles of the same or similar type as the damaged vehicle. The collision data may further include one or several combinations of impact or collision characteristics that are equated and/or associated to a known amount of vehicle damage. For example, vehicle damage associated with front-end impacts at various vehicle speeds may be associated with a list of vehicle parts likely to need repair and/or replacement from such impacts. By comparing the crash characteristics of the damaged vehicle to impact and/or collision characteristics of the collision data, damage to individual vehicle parts may be identified (block 566). For example, the processing center 102 may identify damage to the hood, the rear quarter panel, the side panel, the roof, etc.

In addition to identifying damage to individual vehicle parts, the comparison may also be analyzed to determine the extent of the damage to vehicle parts (block 568). For example, the crash characteristics of the damaged vehicle may be compared to collision data to determine whether the damaged vehicle parts need to be repaired and/or replaced. In addition to determining whether the damaged vehicle parts need to be repaired, the comparison may also be analyzed to determine whether the repair will be a light, moderate, heavy, etc., repair.

Once the extent of the damage is estimated for each damaged vehicle part, a repair code from the set of repair codes is generated for each of the damaged vehicle parts (block 570). For example a repair code may correspond to a particular combination of vehicle characteristics such as the vehicle make and model, the vehicle part being repaired, the type of repair for the vehicle part including whether the vehicle part needs to be repaired and/or replaced, the extent of the damage to the vehicle part, etc. The repair code may be generated based on the vehicle characteristics for the damaged vehicle part, and may be associated with a cost estimate for repairing or replacing the vehicle part. The repair codes for each damaged vehicle part may then be aggregated (block 572) to calculate a total cost estimate of repairing the vehicle (block 574). The total cost estimate and each of the repair codes may be provided to a treatment facility to provide the treatment facility with an expectation of the cost of repair for the damaged vehicle, and so the treatment facility knows what needs to be done to repair the vehicle without having to perform an inspection. In some embodiments, the total cost estimate may also be provided to the policy-holder.

Figure 7:
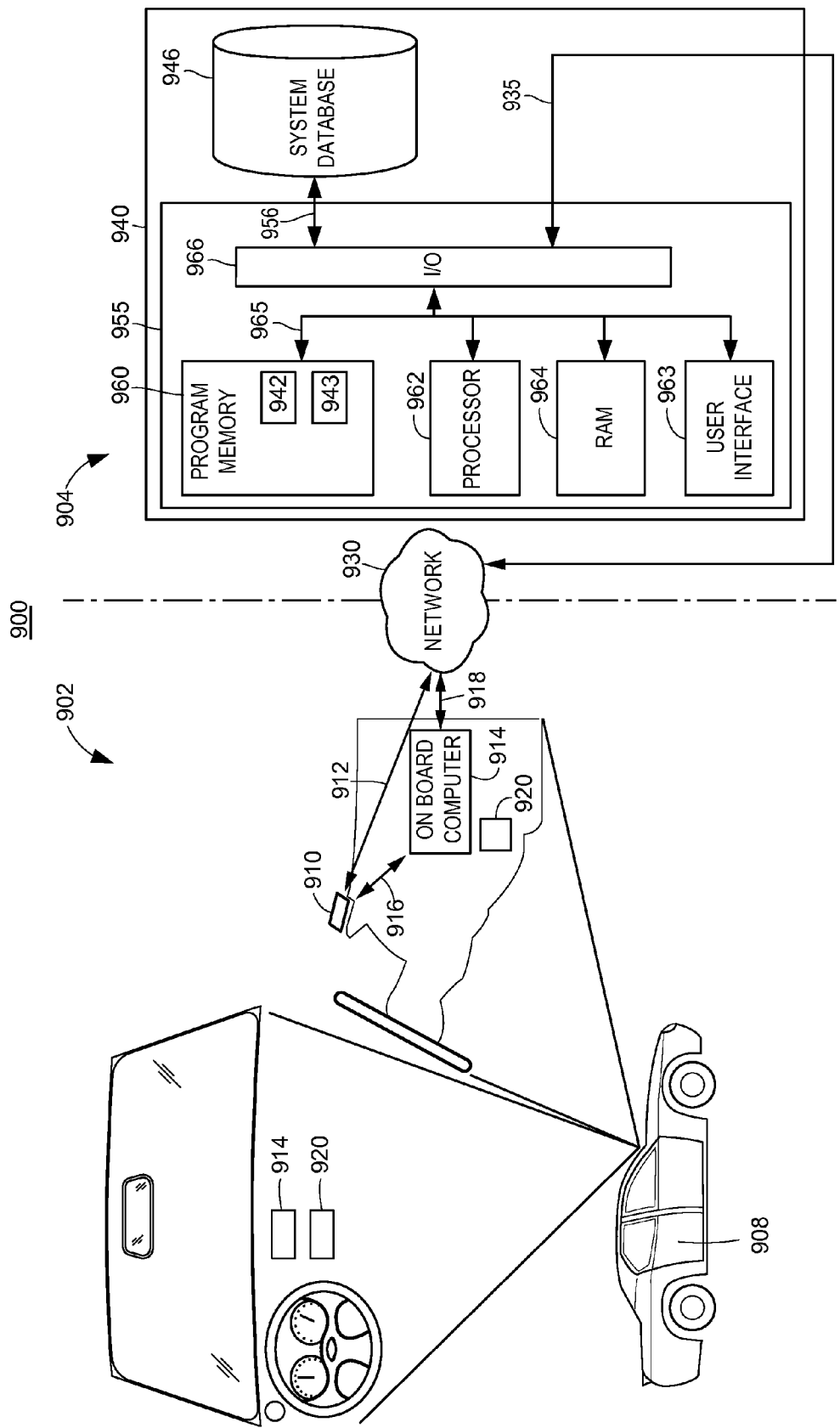
FIG. 7 is a block diagram depicting a mobile computing device, an on-board computing device, a server device, and a communication network that may configured in the example system for treating a damaged vehicle in accordance with the described embodiments.

FIG. 7 illustrates a block diagram of an example treatment system 900 capable of being incorporated into the treatment system 100 shown in FIG. 1 and supporting the processes described herein for treating a vehicle damaged in a crash. The high-level architecture of the vehicle treatment system 900 includes both hardware and software applications, as well as various data communications channels for communicating data between the various hardware and software components. The vehicle treatment system 900 may be divided into front-end components 902 and back-end components 904. The front-end components 902 include one or more computing devices, such as a mobile computing device 910 and/or an on-board computing device 914. Either computing device 910, 914 may be permanently or removably attached to a vehicle 908 and may interface with various sensors coupled to the vehicle 908 (e.g., a speedometer, an accelerometer, a compass, a global position unit (GPS), spatial sensors disposed throughout the vehicle, etc.) and/or may interface with various external output devices in the vehicle 908, such as one or more tactile alert systems, one or more speakers, one or more displays, etc.

Each of the mobile computing device 910 and the on-board computing device 914 is capable of performing all of the functions of the computing device described herein or may supplement the functions performed by the other computing device. The mobile computing device 910 and on-board computing device 914 may communicate with one another directly over a wired or wireless link 916. In addition, the mobile computing device 910 and the on-board computing device 914 may communicate with a network 930 over wired or wireless links 912, 918, respectively. The network 930 may be a proprietary network, a secure public internet, a virtual private network, or some other type of network, such as dedicated access lines, plain ordinary telephone lines, satellite links, etc., and combinations thereof. Where the network 930 comprises the internet, data communications may take place over the network 930 via an internet communication protocol.

The treatment system 900 may also include a notification alert system 920 (e.g., automatic collision notification (ACN), advanced automatic collision or crash notification (AACN), event data recorder (EDR)), that may record and/or transmit information associated with treating the vehicle 908 after being involved in a crash. The front-end components 902 and the back-end components 904 communicate via the communication network 930. The back-end components 904 include a computing device such as a server 940 device or system. The server device 940 may include one or more processors 962 adapted and configured to execute various software applications and/or modules of the vehicle treatment system 900, in addition to other software routines. The server device 940 may further include a database 946 adapted to store the various software applications, modules, and/or routines as well as data related to the operation of the vehicle treatment system 900. The data may include, for example, information collected by the mobile computing device 910 and/or the on-board computing device 914 pertaining to the vehicle treatment system 900 and uploaded to the server device 940, such as sensor inputs, analyses corresponding to the methods discussed above, and images. Other kinds of information that may be stored in the database may include historical vehicle collision data compiled from crash data involving vehicles categorized in the same or similar type of vehicle as the vehicle 908 and contact information relating to vehicle service repair and/or salvage treatment facilities, part suppliers, vehicle transporters, vehicle owner, insurance personnel, etc. The computing devices 910, 914 and/or server device 940 may access or store data and/or software applications in the database 946 when executing various functions and tasks associated with the operation of the vehicle treatment system 900.

Although the vehicle treatment system 900 is shown to include one server device 940, one mobile computing device 910, and one on-board computing device 914, it should be understood that additional server devices 940, mobile computing devices 910, and on-board computing devices 914 may be utilized. For example, the system 900 may include several server devices 940 and numerous mobile computing devices 910, all of which may be interconnected via the network 930. As discussed above, the mobile computing device 910 may perform the various functions described herein in conjunction with the on-board computing device 914 or alone. Likewise, the on-board computing device 914 may perform the various functions described herein in conjunction with the mobile computing device 910 or alone. In either instance, the mobile computing device 910 or on-board computing device may not need to be present. Furthermore, the processing performed by the one or more server devices 940 may be distributed among a plurality of server devices 940 configured in an arrangement known as "cloud computing." This arrangement may provide several advantages, such as, for example, enabling near real-time uploads and downloads of information as well as periodic uploads and downloads of information. This arrangement may provide for a thin-client embodiment of the mobile computing device 910 and/or on-board computing device 914 described herein as well as a primary backup of some or all of the data gathered by the mobile computing device 910 and/or on-board computing device 914. All of the information involved with the treatment system 100, for example, crash information, collision data, VDI/VIN data, images, historical loss information, damage evaluation tools, damaged vehicle parts list, inventory of vehicle parts stored at the storage facility, vehicle transporters, treatment centers, customer contact information, insurance agent/entity contact information, etc. may be displayed in a variety of formats at the server device 940, wherein system personnel and/or the processing center 102 is provided access to such information for treating the damaged vehicle.

The server device 940 may have a controller 955 that is operatively connected to the database 946 via a link 956. The controller 955 may also be operatively connected to the network 930 via a communication link 935. It should be noted that, while not shown, additional databases may be linked to the controller 955 in a known manner. The controller 955 may include a program memory 960, a processor 962 (e.g., a microprocessor or a microcontroller), a random-access memory (RAM) 964, input/output (I/O) circuitry 966, and a user interface module 963 all of which may be interconnected via an address/data bus 965. The user interface module 963 facilitates human-to-machine interaction and may include a display screen, keyboard, mouse device, microphone, speaker, etc. Although the I/O circuitry 966 is shown as a single block, the I/O circuitry 966 may include a number of different types of I/O circuits. The program memory 960 may be configured to store computer-readable instructions that when executed by the processor 962 cause the server device 940 to implement a server application 942 and/or a web server 943. The instructions for the server application 942 may cause the server device 940 to implement the methods described herein. While shown as a single block in FIG. 7; it will be appreciated that the server application 942 may include a number of different programs, modules, routines, sub-routines, etc., that may separately or collectively cause the server device 940 to implement the server application 942. It should also be appreciated that although only one processor 962 is shown, the controller 955 may include multiple processors and/or microprocessors. Similarly, the memory of the controller 955 may include multiple RAMs 964 and multiple program memories 960. The RAM(s) 964 and program memories 960 may be implemented as semiconductor memories, magnetically readable memories, and/or optically readable memories, for example. Further, while the instructions for the server application 942 and web server 943 are shown being stored in the program memory 960, the instructions may additionally or alternatively be stored in the database 946 and/or RAM 964.

Alternatively, the vehicle treatment system 900 may include only the front-end components 902. For example, a mobile computing device 910 and/or on-board computing device 914 may perform any and/or all of the processing associated with compiling or gathering crash information, determining a treatment complexity level based on the crash information, determining a treatment for the vehicle based on the treatment complexity level, generating repair codes, determining a total cost estimate for repairing the vehicle based on the repair codes, and transmitting information associated with the treatment of the vehicle.

Figure 8:
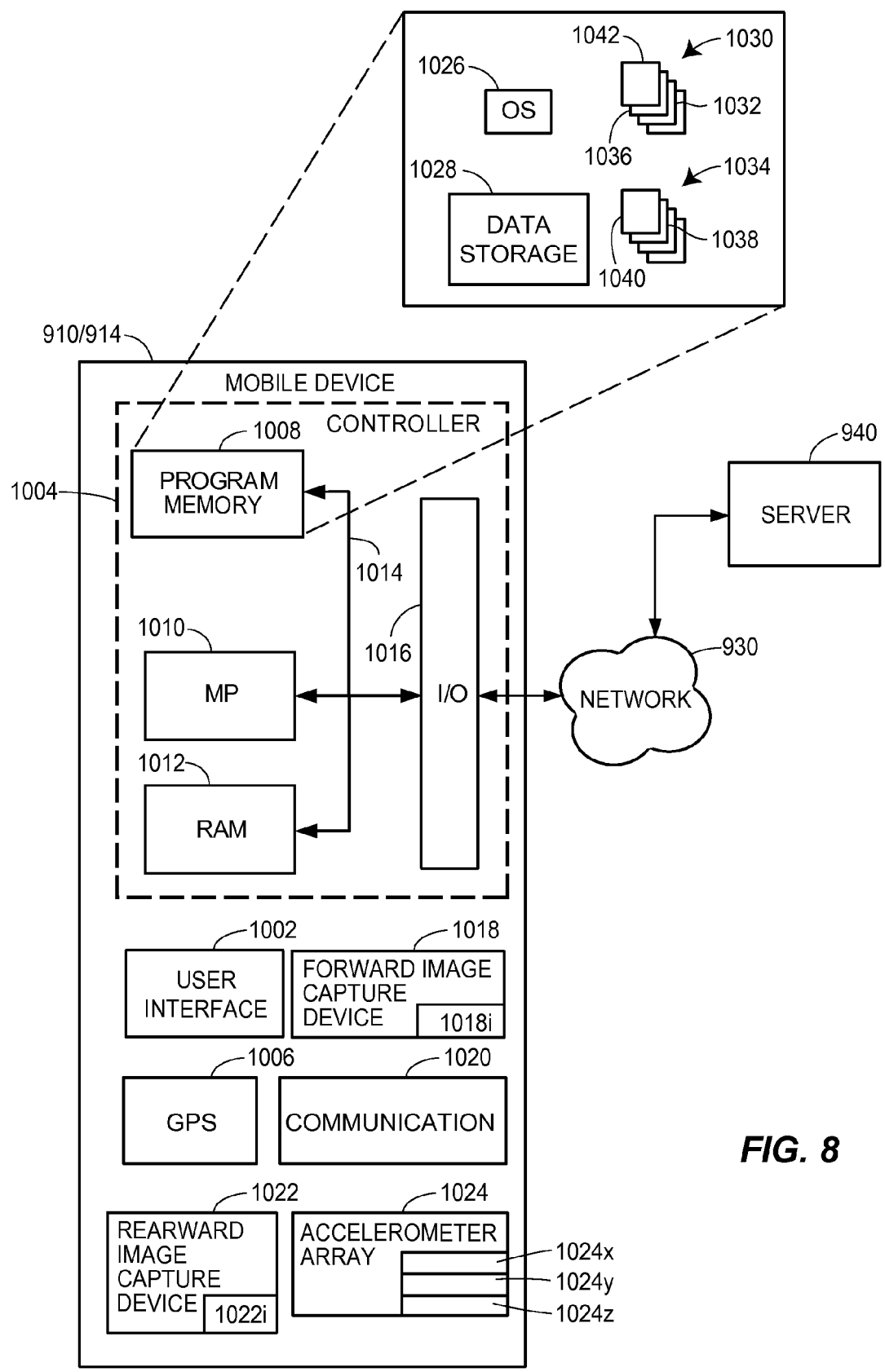
FIG. 8 is a block diagram of an example mobile computing device, on-board computing device, and/or server device capable of being implemented in the system shown in FIG. 7.

Referring now to FIG. 8, the mobile computing device 910 may include a user interface module 1002, a positioning module 1006 such as a global positioning system (GPS) module, a communication module 1020 which may include one or more wireless radios, a forward image capture module 1018, a rearward image capture module 1022, an accelerometer array 1024, and a controller 1004. Similarly, the on-board computing device 914 may include a user interface module 1002, a GPS module 1006, a communication module 1020 which may include one or more wireless radios, a forward image capture module 1018, a rearward image capture module 1022, an accelerometer array 1024, and a controller 1004.

The mobile computing device 910 and on-board computing device 914 may be integrated into a single device that can perform the functions of both devices. It will be appreciated that functions performed by either the mobile computing device 910 or the on-board computing device 914 may also be performed by the on-board computing device 914 in cooperation with the mobile computing device 910. The mobile computing device 910 may be a general-use mobile personal computer, cellular phone, smartphone, tablet computer, wearable computer (e.g., a watch, glasses, etc.), or a device dedicated to facilitating treatment of a damaged vehicle. The on-board computing device 914 may be a general-use on-board computer capable of performing the functions relating to vehicle operation or dedicated to facilitate treatment of a damaged vehicle. The on-board computing device 914 may be installed by the manufacturer of the vehicle 908 or as an aftermarket modification to the vehicle. Further, the mobile computing device 910 and/or on-board computing device 914 may be a thin-client device that outsources some or most processing to the server device 940.

Similar to the controller 955, the controller 1004 includes a program memory 1008, a microprocessor (MP) 1010, a random-access memory (RAM) 1012, and input/output (I/O) circuitry 1016, all of which are interconnected via an address/data bus 1014. Although the I/O circuitry 1016 is depicted in FIG. 8 as a single block, the I/O circuitry 1016 may include a number of different types of I/O circuits. The program memory 1008 includes an operating system 1026, a data storage device 1028, a plurality of software applications 1030, and a plurality of software routines 1034. The operating system 1026 may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 1028 may include application data for the plurality of applications 1030, routine data for the plurality of routines 1034, and other data necessary to interact with the server 940 through the network 930. In particular, the data storage device 1028 may include vehicle collision data associated with a vehicle type that includes the vehicle 908. The vehicle type may include the make, model, and year of the vehicle. The vehicle collision data may include one or more compilations of recorded measurements of damaged vehicle parts and components and the corresponding acceleration and derived vectors, e.g., velocity and direction, of such characteristics attributed for the damage. In some embodiments, the controller 1004 may also include, or otherwise be operatively coupled for communication with other data storage mechanisms (e.g., one or more hard disk drives, optical storage drives, solid state storage devices, etc.) that may reside within the mobile computing device 910 and/or on-board computer 914 or operatively coupled to the network 930 and/or server device 940.

The GPS module 1006 may use "Assisted GPS" (A-GPS), satellite GPS, or any other suitable global positioning protocol or system that locates vehicle 908 via the position of the mobile computing device 910 and/or on-board computing device 914. For example, A-GPS utilizes terrestrial cell phone towers or Wi-Fi hotspots (e.g., wireless router points) to more accurately and more quickly determine the location of the vehicle 908 via the mobile computing device 910 and/or on-board computing device 914 while satellite GPS is generally more useful in more remote regions that lack cell towers or Wi-Fi hotspots. The GPS module 1006 may also facilitate the determination of the velocity and direction of the vehicle 908, via the coupling of the mobile computing device 910 and/or on-board computing device 914 to the vehicle.

The accelerometer array 1024 is one example of a telematics device or module that may incorporate one or more accelerometers positioned to determine the acceleration and direction of movements of the mobile computing device 910 and/or on-board computing device 914, which effectively correlate to the acceleration and direction of movements of the vehicle 908. In some embodiments, the accelerometer array 1024 may include an X-axis accelerometer 1024x, a Y-axis accelerometer 1024y, and a Z-axis accelerometer 1024z to measure the acceleration and direction of movement in each respective dimension. It will be appreciated by those of ordinary skill in the art that a three dimensional vector describing a movement of the vehicle 908 via the mobile computing device 910 and/or on-board computing device 914 through three dimensional space can be established by combining the outputs of the X-axis, Y-axis, and Z-axis accelerometers 1024$x$, $y$, $z$ using known methods. Single- and multi-axis models of the accelerometer 1024 are capable of detecting magnitude and direction of acceleration as a vector quantity, and may be used to sense orientation and/or coordinate acceleration of the vehicle 908.

The forward and rearward image capture module 1018, 1022 may be built-in cameras within the mobile computing device 910 and/or on-board computing device 914 and/or may be peripheral cameras, such as webcams, cameras installed inside the vehicle 908, cameras installed outside the vehicle 908, etc., that are communicatively coupled with the mobile computing device 910 and/or on-board computing device 914. The image capture module 1018, 1022 may be oriented toward the front and rear of the vehicle 908. For example, the forward image capture module 1018 may be oriented toward the front of the vehicle 908 to observe the forward area of the vehicle 908 while the rearward image capture module 1022 may be oriented toward the rear of the vehicle 908 to observe the rearward area of the vehicle 908, or vice-versa. Some embodiments of the treatment system 900 may have both a forward image capture module 1018 and a rearward image capture module 1022, but other embodiments may have only one or no image capture module. Further, either or both of the forward image capture module 1018 and the rearward image capture module 1022 may include an infrared illuminator 1018$i$, 1022$i$, respectively, to facilitate low light and/or night image capturing. Such an infrared illuminator 1018$i$, 1022$i$ may be automatically activated when light is insufficient for image capturing.

The GPS module 1006, the image capture modules 1018, 1022, and the accelerometer array 1024 may be referred to collectively as the "sensors" of the mobile computing device 910 and/or on-board computing device 914. Of course, it will be appreciated that additional GPS modules 1006, image capture modules 1018, 1022, and/or the accelerometer arrays 1024 may be operatively coupled to the mobile computing device 910 and/or on-board computing device 914. Further, the mobile computing device 910 and/or on-board computing device 914 may also include or be coupled to other sensors such as a thermometer, microphone, thermal image capture device, biomedical sensor, etc. The microphone may be incorporated with the user interface module 1002 and used to receive voice inputs from the vehicle operator while the thermometer and/or thermal image capture device may be used to determine fire or heat damage to the vehicle 908, and the biomedical sensor may capture biological characteristics of the vehicle operator.

The communication module 1020 may communicate with the server device 940 via any suitable wired or wireless communication protocol network, such as a wireless telephony network (e.g., GSM, CDMA, LTE, etc.), a Wi-Fi network (802.11 standards), a WiMAX network, a Bluetooth network, etc. The communication unit 1020 may also be capable of communicating using a near field communication standard (e.g., ISO/IEC 18092, standards provided by the NFC Forum, etc.).

The mobile computing device 910 and/or on-board computing device 914 may include the user-input interface 1002, which may include a "soft" keyboard that is presented on a display screen of the mobile computing device 910 and/or on-board computing device 914, an external hardware keyboard communicating via a wired or a wireless connection (e.g., a Bluetooth keyboard), and an external mouse, or any other suitable user-input device or component (see examples in FIG. 8). As described earlier, the user-input module 1002 may also include a microphone (not shown) capable of receiving voice input from a vehicle operator as well as a display screen.

With reference to the controllers 955, 1004, it should be appreciated that although FIG. 8 depicts only one microprocessor 1010, the controller 1004 may include multiple microprocessors 1010. The memory of the controller 1004 may also include multiple RAMs 1012 and multiple program memories 1008. The controller 1004 may implement the RAM 1012 and the program memories 1008 as semiconductor memories, magnetically readable memories, and/or optically readable memories, for example. The one or more processors 1010 may be adapted and configured to execute any of the plurality of software applications 1030 and/or any of the plurality of software routines 1034 residing in the program memory 1008, in addition to other software applications. One of the plurality of applications 1030 may be a client application 1032 that may be implemented as a series of machine-readable instructions for performing the various functions associated with implementing the vehicle treatment system 900 as well as receiving information at, displaying information on, and transmitting information from the mobile device 910 and/or the on-board computing device 914. A client application 1032 may function to implement a system wherein the front-end components 902 communicate and cooperate with back-end components 904 as described above. The client application 1032 may include machine-readable instructions for implementing the user interface 1002 to allow a user to input commands to, and receive information from, the vehicle treatment system 900. One of the plurality of applications 1030 may be a native web browser 1036, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server device 940 or other back-end components 904 while also receiving inputs from the vehicle operator. Another application of the plurality of applications may include an embedded web browser 1042 that may be implemented as a series of machine-readable instructions for receiving, interpreting, and displaying web page information from the server device 940 or other back-end components 904 within the client application 1032.

Another of the plurality of client applications 1030 or routines 1034 may include an accelerometer routine 1038 that determines the acceleration and direction of movements of the mobile computing device 910 and/or on-board computing device 914, which correlate to the acceleration and direction of the vehicle 908. The accelerometer routine may process data from the accelerometer array 1024 to determine one or more vectors describing the motion of the vehicle 908 for use with the client application 1032. In some embodiments where the accelerometer array 1024 has X-axis, Y-axis, and Z-axis accelerometers 1024$x,y,z$, the accelerometer routine 1038 may combine the data from each accelerometer 1024$x,y,z$ to establish the vectors describing the motion of the vehicle 908 as it moves through three dimensional space. In some embodiments, the accelerometer routine 1038 may use data pertaining to less than three axes.

Another routine in the plurality of applications 1030 or routines 1034 may include a vehicle velocity routine 1040 that coordinates with the GPS module 1006 to retrieve vehicle velocity and direction information for use with one or more of the plurality of applications, such as the client application 1032, or for use with other routines.

Yet another routine in the plurality of applications 1030 or routines 1034 may include an image capture routine that coordinates with the image capture modules 1018, 1022 to retrieve image data for use with one or more of the plurality of applications, such as the client application 1032, or for use with other routines.

Another routine in the plurality of applications 1030 or routines 1034 may include a position determination routine that coordinates with the spatial sensors disposed throughout the vehicle to determine the position of vehicle parts relative to the vehicle for use with one or more of the plurality of applications, such as the client application 1032, or for use with other routines.

The user or vehicle operator may also launch or instantiate any other suitable user interface application (e.g., the native web browser 1036, or any other one of the plurality of software applications 1030) to access the server device 940 to implement the vehicle treatment system 900. Additionally, the user or vehicle operator may launch the client application 1032 from the mobile computing device 910 and/or on-board computing device 914, to access the server device 940 to implement the vehicle treatment system 900.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed:

1. A method for detecting potential fraud in vehicle insurance claims, the method executed by one or more processors programmed to perform the method, the method comprising:
   receiving, at one or more processors, identification information for a damaged vehicle and sensor data captured during a vehicle crash involving the damaged vehicle including at least one of: vehicle part position data from spatial sensors disposed within the damaged vehicle, vehicle acceleration data from an accelerometer disposed within the damaged vehicle, vehicle velocity data from a positioning device disposed within the damaged vehicle, or vehicle direction data from the positioning device;
   receiving, at the one or more processors, an indication of an injury for a person involved in the vehicle crash with the damaged vehicle, including a location of the person with respect to the damaged vehicle when the injury occurred and at least one of: an indication of a type of the injury or an indication of a severity of the injury;
   analyzing, by the one or more processors, the identification information and the sensor data to identify a matching set of historical collision data for a same type of vehicle as the damaged vehicle, wherein the matching set of historical collision data includes historical injury data;
   determining, by the one or more processors, one or more likelihoods that at least one of: the received type of the injury occurred or the received severity of the injury occurred from the location of the person with respect to the damaged vehicle based on a subset of the historical injury data corresponding to the matching set of historical collision data for injuries occurring at the location of the person with respect to the damaged vehicle;
   comparing, by the one or more processors, each of the one or more determined likelihoods to one of a plurality of predetermined threshold likelihoods;
   when each determined likelihood is less than the respective predetermined threshold likelihood, generating, by the one or more processors, a suspicious loss indicator for the injury based on the likelihood that the received injury occurred; and
   transmitting, by the one or more processors via a communication network, the suspicious loss indicator to a mobile computing device for display to flag the injury as a risk of fraud.

2. The method of claim 1, wherein historical injury data includes at least one of:
   a number of people injured in past collisions involving the same type of vehicle having matching crash information with the damaged vehicle, a number of people having a particular type of injury in past collisions involving the same type of vehicle having matching crash information with the damaged vehicle, a number of people having a particular injury severity from a set of injury severities in past collisions involving the same type of vehicle having matching crash information with the damaged vehicle, wherein the set of injury severities includes minor, moderate, and severe, or a number of people injured in a particular location from a set of locations in past collisions involving the same type of vehicle having matching crash information with the damaged vehicle, wherein the set of locations includes a driver seat in the same type of vehicle, a passenger seat in the same type vehicle, a driver seat in another vehicle which collided with the same type of vehicle, and a passenger seat in the other vehicle which collided with the same type of vehicle.

3. The method of claim 2, wherein determining a likelihood that the received type or severity of the injury occurred based on the historical injury data comprises determining, by the one or more processors, a percentage of people who were injured in past collisions involving the same type of vehicle having matching crash information with the damaged vehicle based on the historical injury data.

4. The method of claim 1, wherein receiving an indication of an injury further comprises receiving, at the one or more processors,
an indication of medical expenses associated with the injury.

5. The method of claim 1, wherein the location of the person involved in the vehicle crash with the damaged vehicle includes at least one of:
a driver seat in the damaged vehicle,
a passenger seat in the damaged vehicle,
a driver seat in another vehicle which collided with the damaged vehicle, or
a passenger seat in the other vehicle which collided with the damaged vehicle.

6. The method of claim 1, wherein generating the suspicious loss indicator further comprises determining, by the one or more processors, a suspicious loss category from a set of suspicious loss categories based on the likelihood that the received injury occurred including high risk, medium risk, and low risk.

7. A system for detecting potential fraud in vehicle insurance claims, the system comprising:
a communication network; and
one or more computing devices communicatively coupled to the communication network, each of the one or more computing devices having a memory and one or more processors and at least one of the computing device configured to:
receive identification information for a damaged vehicle and sensor data captured during a vehicle crash involving the damaged vehicle including at least one of: vehicle part position data from spatial sensors disposed within the damaged vehicle, vehicle acceleration data from an accelerometer disposed within the damaged vehicle, vehicle velocity data from a positioning device disposed within the damaged vehicle, or vehicle direction data from the positioning device via the communication network,
receive an indication of an injury for a person involved in the vehicle crash with the damaged vehicle via the communication network, including a location of the person with respect to the damaged vehicle when the injury occurred and at least one of: an indication of a type of the injury or an indication of a severity of the injury,
analyze the identification information and the sensor data to identify a matching set of historical collision data for a same type of vehicle as the damaged vehicle, wherein the matching set of historical collision data includes historical injury data,
determine one or more likelihoods that at least one of: the received type of injury occurred or the received severity of the injury occurred from the location of the person with respect to the damaged vehicle based on a subset of the historical injury data corresponding to the matching set of historical collision data for injuries occurring at the location of the person with respect to the damaged vehicle,
compare each of the one or more determined likelihoods to one of a plurality of predetermined threshold likelihoods,
when each determined likelihood is less than the respective predetermined threshold likelihood, generate a suspicious loss indicator for the injury based on the likelihood that the received injury occurred; and
transmit, via the communication network, the suspicious loss indicator to a mobile computing device for display to flag the injury as a risk of fraud.

8. The system of claim 7, wherein historical injury data includes at least one of:
a number of people injured in past collisions involving the same type of vehicle having matching crash information with the damaged vehicle,
a number of people having a particular type of injury in past collisions involving the same type of vehicle having matching crash information with the damaged vehicle,
a number of people having a particular injury severity from a set of injury severities in past collisions involving the same type of vehicle having matching crash information with the damaged vehicle, wherein the set of injury severities includes minor, moderate, and severe, or
a number of people injured in a particular location from a set of locations in past collisions involving the same type of vehicle having matching crash information with the damaged vehicle, wherein the set of locations includes a driver seat in the same type of vehicle, a passenger seat in the same type vehicle, a driver seat in another vehicle which collided with the same type of vehicle, and a passenger seat in the other vehicle which collided with the same type of vehicle.

9. The system of claim 8, wherein to determine a likelihood that the received type or severity of the injury occurred based on the historical injury data, the at least one computing device is configured to determine a percentage of people who were injured in past collisions involving the same type of vehicle having matching crash information with the damaged vehicle based on the historical injury data.

10. The system of claim 7, wherein to receive an indication of an injury, the at least one computing device is further configured to receive:
an indication of medical expenses associated with the injury.

11. The system of claim 7, wherein the location of the person involved in the vehicle crash with the damaged vehicle includes at least one of:

a driver seat in the damaged vehicle,
a passenger seat in the damaged vehicle,
a driver seat in another vehicle which collided with the damaged vehicle, or
a passenger seat in the other vehicle which collided with the damaged vehicle.

12. The system of claim 7, wherein to generate the suspicious loss indicator, the at least one computing device is further configured to determine a suspicious loss category from a set of suspicious loss categories based on the likelihood that the received injury occurred including high risk, medium risk, and low risk.

* * * * *